(12) United States Patent
Chai

(10) Patent No.: US 12,004,258 B2
(45) Date of Patent: Jun. 4, 2024

(54) METHOD AND SYSTEM FOR PERFORMING CHARGING ON NETWORK RESOURCE, AND RELATED DEVICE

(71) Applicant: Huawei Technologies Co., Ltd., Shenzhen (CN)

(72) Inventor: Xiaoqian Chai, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 391 days.

(21) Appl. No.: 17/321,156

(22) Filed: May 14, 2021

(65) Prior Publication Data

US 2021/0281997 A1    Sep. 9, 2021

Related U.S. Application Data

(63) Continuation of application No. PCT/CN2019/117105, filed on Nov. 11, 2019.

(30) Foreign Application Priority Data

Nov. 15, 2018    (CN) .................... 201811361400.X

(51) Int. Cl.
    *H04W 8/18*    (2009.01)
    *H04W 4/24*    (2018.01)
    *H04W 24/08*   (2009.01)

(52) U.S. Cl.
    CPC ............... *H04W 8/18* (2013.01); *H04W 4/24* (2013.01); *H04W 24/08* (2013.01)

(58) Field of Classification Search
    CPC ....... H04W 4/24; H04W 24/00; H04W 24/02; H04W 24/04; H04W 24/08; H04W 24/10;
    (Continued)

(56) References Cited

U.S. PATENT DOCUMENTS

2018/0220277 A1   8/2018  Senarath et al.
2019/0313212 A1*  10/2019 Lee .................... H04W 4/029
(Continued)

FOREIGN PATENT DOCUMENTS

CN    106657194 A    5/2017
CN    106713406 A    5/2017
(Continued)

OTHER PUBLICATIONS

"3rd Generation Partnership Project; Technical Specification Group Services and System Aspects; Management and orchestration; Generic management services; (Release 15)," 3GPP TS 28.532 V15.0.1, total 139 pages, 3rd Generation Partnership Project, Valbonne, France (Sep. 2018).
(Continued)

*Primary Examiner* — Peter Chen
(74) *Attorney, Agent, or Firm* — Leydig, Voit & Mayer, Ltd.

(57) ABSTRACT

A method for performing charging on a network resource is provided. The method mainly includes: determining a network slice performance indicator that is used for performing charging on a network slice instance; subscribing to data corresponding to the network slice performance indicator from a network slice management device; and performing charging on the network slice instance based on the data corresponding to the network slice performance indicator. According to the method, a charging result for a customer matches an input of an operator for the network slice instance, to help improve network resource utilization rate and meet diversified network service requirements of an industry customer.

20 Claims, 10 Drawing Sheets

(58) Field of Classification Search
CPC . H04W 48/18; H04W 28/0268; H04W 28/24; H04W 8/18; H04L 12/14; H04L 12/1403; H04L 12/1407; H04L 41/40; H04L 41/5012; H04L 41/5016; H04L 41/5029; H04L 41/5048; H04L 41/5051; H04M 15/41; H04M 15/66
See application file for complete search history.

(56) References Cited

U.S. PATENT DOCUMENTS

| | | | | |
|---|---|---|---|---|
| 2020/0169951 | A1* | 5/2020 | Cai | H04W 4/24 |
| 2021/0176366 | A1* | 6/2021 | Garcia Azorero | H04M 15/66 |

FOREIGN PATENT DOCUMENTS

| | | |
|---|---|---|
| EP | 3402232 A1 | 11/2018 |
| EP | 3606160 A1 | 2/2020 |
| WO | 2018195877 A1 | 11/2018 |
| WO | 2018200733 A1 | 11/2018 |

OTHER PUBLICATIONS

"3rd Generation Partnership Project; Technical Specification Group Services and System Aspects; Management and orchestration; Architecture framework (Release 15)," 3GPP TS 28.533 V15.0.0, total 23 pages, 3rd Generation Partnership Project, Valbonne, France (Sep. 2018).

"3rd Generation Partnership Project; Technical Specification Group Services and System Aspects; Telecommunication management; Charging management; Charging architecture and principles (Release 15)," 3GPP TS 32.240 V15.3.0 total 60 pages, 3rd Generation Partnership Project, Valbonne, France (Sep. 2018).

"3rd Generation Partnership Project; Technical Specification Group Services and System Aspects; Telecommunication management; Charging management; 5G system; Services, operations and procedures of charging using Service Based Interface (SBI) (Release 15)," 3GPP TS 32.290 V15.1.0, total 25 pages, 3rd Generation Partnership Project, Valbonne, France (Sep. 2018).

"3rd Generation Partnership Project; Technical Specification Group Services and System Aspects; Telecommunication management; Charging management; 5G system, charging service; Stage 3 (Release 15)," 3GPP TS 32.291 V15.0.0 total 59 pages, 3rd Generation Partnership Project, Valbonne, France (Sep. 2018).

"3rd Generation Partnership Project; Technical Specification Group Services and System Aspects; Telecommunication management; Charging management; Charging Data Record (CDR) parameter description (Release 15)," 3GPP TS 32.298 V15.4.0, total 224 pages, 3rd Generation Partnership Project, Valbonne, France (Sep. 2018).

* cited by examiner

METHOD AND SYSTEM FOR PERFORMING CHARGING ON NETWORK RESOURCE, AND RELATED DEVICE

CROSS-REFERENCE TO RELATED APPLICATIONS

This application is a continuation of International Application No. PCT/CN2019/117105, filed on Nov. 11, 2019, which claims priority to Chinese Patent Application No. 201811361400.X, filed on Nov. 15, 2018. The disclosures of the aforementioned applications are hereby incorporated by reference in their entireties.

TECHNICAL FIELD

This application relates to the communications field, and in particular, to a method and system for performing charging on a network resource, and a related device.

BACKGROUND

Main application scenarios of a 5G (5th generation) network include an eMBB (enhanced mobile broadband) scenario, a URLLC (ultra-reliable low-latency communication) scenario, an mMTC (massive machine-type communications) scenario, and the like. These scenarios have different requirements on network features. For example, in the mMTC scenario, there are many devices, but a throughput of each device may be extremely low and a small bandwidth is required. In the eMBB scenario, almost an opposite feature is required because there are much fewer devices, but each device sends or receives a large amount of data and a large bandwidth is required. In the URLLC scenario, there is a high requirement on an end-to-end latency. For example, in an automatic driving scenario, a latency needs to be less than 3 milliseconds. To meet requirements of the foregoing different application scenarios, a physical network may be divided at an end-to-end layer, to form a network slice, so as to implement traffic grouping, tenant isolation, and resource configuration on a macroscopic scale. The network slice is essentially a virtual network running on a shared physical network infrastructure. An operator may create, based on different service requirements (for example, requirements on a latency, a bandwidth, security, and reliability) and from the physical network infrastructure, virtual networks (corresponding to network slice instances) that meet corresponding service requirements, so as to be used by customers having different requirements on network feature. In this way, network resource utilization rate and quality of service of a network service are improved.

In the conventional technology, a solution for performing charging on a network resource is as follows: a service system triggers a charging system to perform charging based on a service event such as start or end of a service, and the service system collects statistics about accurate service information (such as traffic and duration used by the service) and reports the accurate service information to the charging system, so that the charging system can perform rating and fee deduction based on the accurate service information.

If charging on the network slice instance is still performed in the foregoing way, a charging result does not match an investment of the operator for the corresponding network slice instance. Consequently, this is not conducive to implementation of the foregoing diversified application scenarios, and further reduces network resource utilization rate or quality of service of a network service.

SUMMARY

In view of above-mentioned problems, a method for performing charging on a network resource, to perform charging based on a service level satisfaction degree of a network slice instance, is provided. This helps improve network resource utilization rate of an operator, and can better meet diversified network requirements of different customers.

According to a first aspect, an embodiment of this application provides a method for performing charging on a network resource. The method includes: a network slice charging function NSCF device sends a first message to a network slice management function NSMF device, where the first message includes an identifier of a network slice instance; the NSCF device receives a second message from the NSMF device, where the second message includes data corresponding to a network slice performance indicator of the network slice instance, and the network slice performance indicator is used to describe network performance of the network slice instance; and the NSCF device performs charging on the network slice instance based on the data corresponding to the network slice performance indicator.

Compared with a conventional linear charging method that is merely based on terminal service data (such as traffic or duration), in this method, charging may be performed on the network slice instance based on the data corresponding to the network slice performance indicator. Because the data corresponding to the network slice performance indicator is data that a customer is concerned about and an investment of an operator can be better reflected, this method helps improve a matching degree between a charging result and a network resource investment, so as to help implement diversified application scenarios, and further help improve network resource utilization rate or quality of service of a network service.

In a possible solution, the first message further includes the network slice performance indicator.

In a possible solution, before sending the first message to the NSMF device, the NSCF device further determines the network slice performance indicator.

In a possible solution, that the NSCF device determines the network slice performance indicator specifically includes: the NSCF device determines the network slice performance indicator based on subscription information, of a customer, for subscribing to the network slice instance.

In a possible solution, the subscription information includes any one or any combination of a service level agreement term, a network slice type, a network slice template, or subscription duration of the network slice instance.

In a possible solution, the data corresponding to the network slice performance indicator includes a value of the network slice performance indicator, and that the NS CF device performs charging on the network slice instance based on the data corresponding to the network slice performance indicator specifically includes: the NSCF device stores the value of the network slice performance indicator in a first charging data record.

In a possible solution, the data corresponding to the network slice performance indicator further includes a time of the network slice performance indicator, and that the NS CF device performs charging on the network slice instance based on the data corresponding to the network slice performance indicator specifically further includes: the NSCF device further stores the time of the network slice performance indicator in the first charging data record.

In a possible solution, the data corresponding to the network slice performance indicator does not include a time of the network slice performance indicator, and that the NSCF device performs charging on the network slice instance based on the data corresponding to the network slice performance indicator specifically further includes: the NSCF device further stores a time at which the second message is received as the time of the network slice performance indicator in the first charging data record.

In a possible solution, that the NSCF device performs charging on the network slice instance based on the data corresponding to the network slice performance indicator specifically further includes: the NSCF device determines a time range for providing statistics about the network slice performance indicator, and determines a method for providing statistics about the network slice performance indicator; the NSMF device provides statistics on a value of the network slice performance indicator within the time range for providing statistics in the first charging data record by using the method for providing statistics, to obtain a statistics value of the network slice performance indicator; and the NSCF device performs charging on the network slice instance based on the statistics value of the network slice performance indicator.

In a possible solution, before sending the first message to the NSMF device, the NSCF device further determines a time range for providing statistics of the network slice performance indicator, where the time range for providing statistics is used to indicate the NSMF device to provide statistics on one or more values of the network slice performance indicator within the time range for providing statistics; and the first message further includes the time range for providing statistics.

In the foregoing possible solution, as a charging function device, the NSCF device collects a large amount of performance data of the network slice instance. This helps carry out a richer and more flexible charging service. For example, for a very important customer, a new method for providing statistics may be used to provide a new statistics value at a later stage, and a fee for use of the network slice instance is calculated based on the new statistics value and a new charging rule. As a network slice management device, the NSMF device only needs to be responsible for collecting/ gathering the value of the network slice performance indicator, and does not need to involve a charging-related statistical operation. Therefore, calculation burden of the NSMF device may be reduced.

In a possible solution, before sending the first message to the NSMF device, the NSCF device further determines a method for providing statistics about the network slice performance indicator, where the method for providing statistics is used to indicate the NSMF device to provide statistics on one or more values of the network slice performance indicator within the time range for providing statistics by using the method for providing statistics; and the first message further includes the method for providing statistics.

In a possible solution, the data corresponding to the network slice performance indicator includes a statistics value of the network slice performance indicator, and that the NSCF device performs charging on the network slice instance based on the data corresponding to the network slice performance indicator specifically includes: the NSCF device performs charging on the network slice instance based on the statistics value of the network slice performance indicator.

In a possible solution, that the NSCF device performs charging on the network slice instance based on the data corresponding to the network slice performance indicator specifically includes: the NSCF device stores the statistics value of the network slice performance indicator in a second charging data record.

In a possible solution, that the NSCF device performs charging on the network slice instance based on the data corresponding to the network slice performance indicator specifically further includes: the NSCF device calculates a fee for use of the network slice instance based on the statistics value of the network slice performance indicator.

In a possible solution, that the NSCF device calculates a fee for use of the network slice instance based on the statistics value of the network slice performance indicator specifically includes: the NSCF device obtains a charging rule corresponding to the network slice performance indicator, where the charging rule includes a fee calculation method corresponding to the statistics value of the network slice performance indicator; and calculates the fee for use of the network slice instance according to the charging rule and the statistics value of the network slice performance indicator.

In the foregoing possible solution, the NSMF device completes sampling and statistics providing of the network slice performance indicator, and the NSCF device completes charging based on the statistics value. An advantage of this solution is that a sampling value of the network slice performance indicator does not need to be frequently transferred between the NSMF device and the NSCF device. Therefore, occupation of a communication bandwidth between the NSMF device and the NSCF device can be reduced, and calculation burden on an NSCF device side can be reduced.

In a possible solution, the statistics value of the network slice performance indicator includes any one or any combination of the following: an average value, a maximum value, a minimum value, a fulfillment degree, accumulated fulfillment duration, an accumulated quantity of fulfillment times, accumulated non-fulfillment duration, or an accumulated quantity of non-fulfillment times that are of the network slice performance indicator.

In a possible solution, the first message further includes an interval time, and the interval time is used to indicate a time interval between two consecutive times of obtaining the value of the network slice performance indicator by the NSMF device. In this solution, the NSCF device may indicate a sampling time interval to the NSMF device, to better meet a charging requirement. For example, a more accurate statistics value may be obtained based on a sampling value with a higher time density, so that charging is more accurate.

In a possible solution, the first message is a subscription request message, the second message is a subscription notification message, the subscription request message is used to request the NSMF device to generate a subscription resource for the network slice instance, and the first message further includes an address for receiving data, to indicate the NSMF device to send the subscription notification message to the NS CF device based on the address.

In a possible solution, the method further includes: the NSCF device sends, to the NSMF device, a subscription update request message for updating the subscription resource, where the subscription update request message includes any one or any combination of a target time range for providing statistics, a target interval time, a target method for providing statistics, or a target network slice performance indicator; and the NSCF device receives, from the NSMF device, the data that corresponds to the network slice performance indicator and that exists before the subscription resource is updated.

In a possible solution, the method further includes: the NSCF device sends an unsubscription request related to the subscription resource to the NSMF device; and the NSCF device receives, from the NSMF device, the data that corresponds to the network slice performance indicator and that exists before unsubscription related to the subscription resource.

In the foregoing possible solution, a subscription-notification mechanism is used, so that the data corresponding to the network slice performance indicator is more timely transferred between the NSMF device and the NSCF device.

According to a second aspect, an embodiment of this application provides a method for performing charging on a network resource. The method includes: s network slice management function NSMF device receives a first message from a network slice charging function NSCF device, where the first message includes an identifier of a network slice instance; the NSMF device obtains, based on the first message, data corresponding to a network slice performance indicator of the network slice instance, where the network slice performance indicator is used to describe network performance of the network slice instance; and the NSMF device sends a second message to the NSCF device, where the second message includes the data corresponding to the network slice performance indicator.

According to the method, the NSMF device can provide the NSCF device with the data corresponding to the network slice performance indicator, so that the NSCF device can perform charging on the network slice instance based on the data corresponding to the network slice performance indicator. This helps improve a matching degree between a charging result and a network resource investment, so as to help implement diversified application scenarios, and help improve network resource utilization rate or quality of service of a network service.

In a possible solution, the network slice performance indicator is a network slice performance indicator that is used for performing charging on the network slice instance, and the first message further includes the network slice performance indicator; and that the NSMF device obtains, based on the first message, data corresponding to a network slice performance indicator of the network slice instance specifically includes: the NSMF device obtains the data corresponding to the network slice performance indicator included in the first message.

In a possible solution, the data corresponding to the network slice performance indicator includes a value of the network slice performance indicator, and that the NSMF device obtains data corresponding to a network slice performance indicator specifically includes: the NSMF device obtains the value of the network slice performance indicator.

In a possible solution, the data corresponding to the network slice performance indicator further includes a time of the network slice performance indicator, and that the NSMF device obtains data corresponding to a network slice performance indicator specifically further includes: the NSMF device obtains the time of the network slice performance indicator.

In a possible solution, the first message further includes a time range for providing statistics; the data corresponding to the network slice performance indicator includes a statistics value of the network slice performance indicator; and that the NSMF device obtains data corresponding to a network slice performance indicator specifically includes: the NSMF device obtains a plurality of values of the network slice performance indicator of the network slice instance within the time range for providing statistics, and provides statistics on the plurality of values of the network slice performance indicator, to obtain the statistics value of the network slice performance indicator.

In a possible solution, the first message further includes a method for providing statistics; and that the NSMF device provides statistics on the plurality of values of the network slice performance indicator specifically includes: the NSMF device provides statistics on the plurality of values of the network slice performance indicator by using the method for providing statistics.

In a possible solution, the first message is a subscription request message, the second message is a subscription notification message, and the first message further includes an address for receiving data; and after the subscription request message is received, a subscription resource is generated for the network slice instance, and the subscription notification message is sent to the NSCF device based on the address for receiving data.

In a possible solution, the method further includes: the NSMF device receives, from the NSCF device, a subscription update request message for updating the subscription resource, where the subscription update request message includes any one or any combination of a target time range for providing statistics, a target interval time, a target method for providing statistics, or a target network slice performance indicator; the NSMF device performs a subscription update operation on the subscription resource based on the subscription update request message; and the NSMF device sends, to the NSCF device, the data that corresponds to the network slice performance indicator and that exists before the subscription resource is updated.

In a possible solution, the method further includes: the NSMF device receives an unsubscription request message related to the subscription resource from the NSCF device; the NSMF device performs an unsubscription operation on the subscription resource based on the unsubscription request message; and the NSMF device sends, to the NSCF device, the data that corresponds to the network slice performance indicator and that exists before unsubscription related to the subscription resource.

In a possible solution, the first message further includes an interval time, and the method further includes: the NSMF device determines, based on the interval time, a time interval between two consecutive times of obtaining the value of the network slice performance indicator. In this solution, the NSMF device may perform sampling based on a sampling time interval indicated by the NSCF device, so as to better meet a requirement of the NSCF device for performing charging.

According to a third aspect, an embodiment of this application provides a network slice charging function device, including a processor and a memory. The memory is configured to store program instructions, and the processor is configured to: invoke and execute the program instructions stored in the memory, so that the network slice charging function device performs the method for performing charging on a network resource in the first aspect.

According to a fourth aspect, an embodiment of this application provides a computer-readable storage medium, including instructions. When the instructions are run on a computer, the computer is enabled to perform the method for performing charging on a network resource in the first aspect.

According to a fifth aspect, an embodiment of this application provides a network slice management function device, including a processor and a memory. The memory is configured to store program instructions, and the processor is configured to: invoke and execute the program instructions stored in the memory, so that the network slice management device performs the method for performing charging on a network resource in the second aspect.

According to a sixth aspect, an embodiment of this application provides a computer-readable storage medium, including instructions. When the instructions are run on a computer, the computer is enabled to perform the method for performing charging on a network resource in the second aspect.

According to a seventh aspect, an embodiment of this application provides a system for performing charging on a network resource, including a network slice management function NSMF device and a network slice charging function NSCF device. The NSCF device sends a first message to the NSMF device, where the first message includes an identifier of the network slice instance; the NSMF device receives the first message, and obtains, based on the first message, data corresponding to a network slice performance indicator of the network slice instance, where the network slice performance indicator is used to describe network performance of the network slice instance; the NSMF device sends a second message to the NSCF device, where the second message includes the data corresponding to the network slice performance indicator; and the NSCF device receives the second message, and performs charging on the network slice instance based on the data that corresponds to the network slice performance indicator and that is in the second message.

In a possible solution, the network slice performance indicator is a network slice performance indicator that is used for performing charging on the network slice instance, and the first message further includes the network slice performance indicator; and before sending the first message to the NSMF device, the NSCF device further determines the network slice performance indicator.

In a possible solution, the data corresponding to the network slice performance indicator includes a value of the network slice performance indicator and a time of the network slice performance indicator; that the NSMF device obtains data corresponding to a network slice performance indicator specifically includes: obtaining the value of the network slice performance indicator and the time of the network slice performance indicator; and that the NSCF device performs charging on the network slice instance based on the data that corresponds to the network slice performance indicator and that is in the second message specifically includes: performing charging on the network slice instance based on the value of the network slice performance indicator and the time of the network slice performance indicator.

In a possible solution, that the NSCF device performs charging on the network slice instance based on the value of the network slice performance indicator and the time of the network slice performance indicator specifically includes: storing the value of the network slice performance indicator and the time of the network slice performance indicator in a first charging data record.

In a possible solution, the first message further includes a time range for providing statistics and a method for providing statistics; that the NSMF device obtains data corresponding to a network slice performance indicator specifically includes: obtaining a value of the network slice performance indicator of the network slice instance, and providing statistics on a plurality of values of the network slice performance indicator of the network slice instance within the time range for providing statistics by using the method for providing statistics, to obtain a statistics value of the network slice performance indicator; and that the NSCF device performs charging on the network slice instance based on the data that corresponds to the network slice performance indicator and that is in the second message specifically includes: performing charging on the network slice instance based on the statistics value of the network slice performance indicator.

In a possible solution, that the NSCF device performs charging on the network slice instance based on the statistics value of the network slice performance indicator specifically includes: calculating a fee for use of the network slice instance based on the statistics value of the network slice performance indicator.

DESCRIPTION OF EMBODIMENTS

The following describes the technical solutions in the embodiments of this application with reference to the accompanying drawings in the embodiments of this application.

Figure 1:
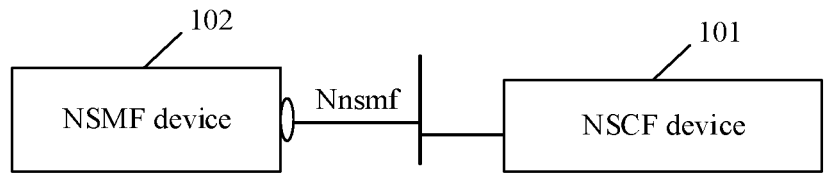
FIG. 1 is an architectural diagram of a charging system according to an embodiment of this application.

FIG. 1 is an architectural diagram of a charging system according to an embodiment of this application. The charging system includes a network slice charging function (NSCF) device 101, a network slice management function (NSMF) device 102, and the like. For ease of description, in the embodiments of this application, the "network slice charging function device" is briefly referred to as an "NSCF device", and the "network slice management function device" is briefly referred to as an "NSMF device". Main functions of the NSCF device and the NSMF device are separately described as follows.

The NSCF device 101 is configured to: determine a network slice performance indicator of a network slice instance, subscribe to, from the NSMF device 102 through an interface (Nnsmf is an example identifier of the interface) provided by the NSMF device 102, data corresponding to the network slice performance indicator of the network slice instance, and perform charging on the network slice instance based on the data.

The network slice performance indicator is used to describe network performance of the network slice instance, and can not only reflect what a customer or a user concerns on using the network slice instance on one aspect or some aspects, but also reflect an investment of an operator on the network slice instance on one aspect or some aspects. The network slice performance indicator may include but is not limited to one or more of the following parameters:

- end-to-end latency, where the end-to-end latency refers to transmission latency of a data packet in an access domain, a transmission domain, and a core network domain of the network slice instance;
- a quantity of PDU (protocol data unit) sessions, where the quantity of PDU sessions refers to a quantity of PDU sessions established on the network slice instance (namely, a quantity of PDU sessions established between user equipment using the network slice instance and a data gateway on the network slice);
- a bandwidth, where the bandwidth refers to a sum of bandwidths used by all concurrent PDU sessions of the network slice instance; and
- a quantity of users, where the quantity of users refers to a quantity of users actually using or concurrently using the network slice instance or a quantity of users registering with the network slice instance.

For ease of description, the network slice performance indicator is also briefly referred to as an "indicator" in the embodiments of this application.

It may be understood that one network slice instance may have one or more network slice performance indicators. A quantity of network slice performance indicators of the network slice instance is not limited in the embodiments of this application.

When an operator and a customer agree on an SLA (service level agreement) for a network slice instance, a constraint condition of a network slice performance indicator may be agreed on, for example, "a quantity of occurrence times that a latency exceeds 5 ms needs to be less than 10", and "accumulated duration in which a bandwidth is less than 100 G does not exceed 30 hours".

In specific implementation, the network slice performance indicator transferred by using a message may be represented by a parameter name or a parameter identifier of the indicator. For example, "E2EDelay" or "101" is used to represent a network slice performance indicator "latency". A manner of representing the network slice performance indicator is not limited in the embodiments of this application. For ease of description, in the embodiments of this application, the parameter name is taken as an example for description.

Optionally, the NSCF device further sends a charging result to a billing system (not shown in FIG. 1), so that the billing system generates a charging bill for the customer.

It may be understood that an actual physical device on which the NSCF device is deployed is not limited in the embodiments of this application. For example, the NSCF device may be independently deployed, or may be deployed on a server integrating a charging function or another physical device.

The NSMF device 102 is configured to provide the NSCF device 101 with the data corresponding to the network slice performance indicator of the network slice instance, including: receiving a subscription request for the data corresponding to the network slice performance indicator of the network slice instance, obtaining the data corresponding to the network slice performance indicator, and sending the data corresponding to the network slice indicator to the NSCF device 101 by using a subscription notification. The NSMF device may be a cross-domain slice manager or a slice manager of a core network subdomain.

For ease of understanding of the embodiments of this application, the following further explains several concepts related to the network slice performance indicator.

(1) Value of the network slice performance indicator: Values of different performance indicators have different meanings. The value of the network slice performance indicator may refer to a specific value obtained by the NSMF device or another device by detecting, sampling, or in other manners on the network slice performance indicator at a moment, within a timeslot, or within a time period (for example, within a minute). For ease of description, in the embodiments of this application, the value of the network slice performance indicator is also referred to as a sampling value of the network slice performance indicator or an instantaneous value of the network slice performance indicator, or even directly referred to as a sampling value or an instantaneous value.

(2) Time of the network slice performance indicator: The time of the network slice performance indicator refers to a time point, a timeslot, or a time period at which the specific value of the network slice performance indicator is obtained through detection, sampling, or in another manner. For ease of description, in the embodiments of this application, the time of the network slice performance indicator is also referred to as a sampling time of the network slice performance indicator or an obtaining time of the network slice performance indicator, or even directly referred to as the sampling time or the obtaining time. It may be understood that the time/sampling time/obtaining time of the network slice performance indicator may be a specific time point, or may be a specific time period (for example, a minute). For example, a sampling time of "a quantity of concurrent sessions" may be "2018-10-26 23:58:52", and a sampling time of "latency" may be "2018-09-26 13:46:00-2018-09-26 13:47:00" or "2018-09-26 13:46".

(3) Constraint condition of the network slice performance indicator: The constraint condition of the network slice performance indicator refers to quantization constraint or a quantization requirement for the value of the network slice performance indicator within a time range for providing statistics, and is usually represented by using a value range, or may be represented by using a specific value. For example, a constraint condition of the indicator "bandwidth" may be "monthly average bandwidth=100 M", or may be "accumulated duration in which the bandwidth is less than 100 M does not exceed 30 hours". A constraint condition of the indicator "latency" may be "a quantity of occurrence times that the latency exceeds 50 ms is less than 10". The constraint condition of the network slice performance indicator is usually a result agreed with the operator in a process in which the customer subscribes to the network slice instance.

(4) Statistics value of the network slice performance indicator: The statistics value of the network slice performance indicator refers to a result obtained by providing statistics on a value that is of the network slice performance indicator and whose sampling time or obtaining time falls within a time range for providing statistics according to a specific method for providing statistics. The method for providing statistics may be a method for providing statistics unrelated to the constraint condition, for example, calculating an average value or a weighted average value, or may be a method for providing statistics related to the constraint condition, that is, a method for providing statistics determined according to a parameter in the constraint condition. The following separately describes several types of statistics values of the network slice performance indicator by using examples. Refer to a case shown in Table 1. It may be understood that a type of the statistics value of the network slice performance indicator is not limited to that listed in Table 1.

TABLE 1

| Type | Meaning | Constraint condition | Method for providing statistics | Example of a statistics providing process |
|---|---|---|---|---|
| Average value | Average value of sampling values within a time range for providing statistics | No constraint condition (charging based on the average value) | Divide a sum of a plurality of sampling values within the time range for providing statistics by a total quantity of sampling times | Sample a bandwidth for 10 times every day, namely, 300 times every month, and divide a sum of bandwidth values obtained through 300 samples by 300, to obtain the average value 89 M/s |
| Maximum value | Maximum value of sampling values within a time range for providing statistics | No constraint condition (charging based on the maximum value) | Determine the maximum value in a plurality of sampling values within the time range for providing statistics | Sample end-to-end latency for 10 times every day, namely, 300 times every month, and select the maximum value 52 ms in the end-to-end latency obtained through 300 samples |
| Minimum value | Minimum value of sampling values within a time range for providing statistics | No constraint condition (charging based on the minimum value) | Determine the minimum value in a plurality of sampling values within the time range for providing statistics | Sample a bandwidth for 10 times every day, namely, 300 times every month, and select a minimum value 61 M/s in bandwidth values obtained through 300 samples |
| Fulfillment degree | Satisfaction degree of a statistics value, of statistics values within the time range for providing statistics, relative to the constraint condition | The constraint condition contains a reference value | After the foregoing values are obtained, divide the values by the reference value | If the average bandwidth in a month is 89 M/s and the constraint condition is that an average bandwidth reaches 100 M/s, the fulfillment degree is 89/100 = 0.89 |
| Accumulated fulfillment duration | Accumulated duration in which sampling values meet the constraint condition within a time range for providing statistics | The constraint condition contains an inequality | Accumulate all duration in which the sampling values meet the inequality within the time range for providing statistics | Sample a bandwidth in 24 segments in a day, each segment lasts for one hour, and if 20 segments meet the constraint condition "bandwidth is greater than or equal to 100 M/s", the accumulated fulfillment duration is 20 hours |
| Accumulated quantity of fulfillment times | Accumulated quantity of occurrence times that sampling values meet the constraint condition within a time range for providing statistics | The constraint condition contains an inequality | Accumulate a quantity of occurrence times that the sampling values meet the inequality within the time range for providing statistics | Sample a bandwidth 24 times in a day, and if the bandwidth meets the constraint condition "bandwidth is greater than or equal to 100 M/s" for 20 times, the accumulated quantity of fulfillment times is 20 |
| Accumulated non- | Accumulated duration in which | The constraint | Accumulate all duration in | Sample a bandwidth in 24 segments in a day, |

TABLE 1-continued

| Type | Meaning | Constraint condition | Method for providing statistics | Example of a statistics providing process |
|---|---|---|---|---|
| fulfillment duration | sampling values do not meet the constraint condition within a time range for providing statistics | condition contains an inequality | which the sampling values do not meet the inequality within the time range for providing statistics | each segment lasts for one hour, and if 4 segments do not meet the constraint condition "bandwidth is greater than or equal to 100 M/s", the accumulated non-fulfillment duration is 4 hours |
| Accumulated quantity of non-fulfillment times | Accumulated quantity of occurrence times that sampling values do not meet the constraint condition within a time range for providing statistics | The constraint condition contains an inequality | Accumulate a quantity of occurrence times that the sampling values do not meet the inequality within the time range for providing statistics | Sample a bandwidth 24 times in a day, and if the bandwidth does not meet the constraint condition "bandwidth is greater than or equal to 100 M/s" for 4 times, the accumulated quantity of non-fulfillment times is 4 |

Based on the foregoing concept, the data corresponding to the network slice performance indicator may be the statistics value of the network slice performance indicator, or may be a combination of the sampling value of the network slice performance indicator and a corresponding sampling time, or may be a combination of the value of the network slice performance indicator and the time of the network slice performance indicator. The statistics value may be provided by the NSMF device 102 and then sent to the NSCF device 101, or the NSMF device 102 sends a combination of sampling values and a sampling time at a plurality of moments within a time range for providing statistics or within a plurality of time periods within a time range for providing statistics to the NSCF device 101, and then, the NSCF device 101 performs statistics providing or calculation to obtain the statistics value. The two cases are separately further described in subsequent embodiments of this application.

It may be understood that an actual physical device on which the NSMF device is deployed is not limited in this application. For example, the NSMF device may be independently deployed, or may be deployed on a physical device having another function.

After receiving the data corresponding to the network slice performance indicator from the NSMF device 102, the NSCF device 101 performs charging on the network slice instance based on the data. Specifically, the performing charging may include: generating a network slice charging data record based on the data, or calculating a fee for use of the network slice instance based on the data, where a method for calculating the fee for use of the network slice instance based on the data may include: obtaining a charging rule related to the network slice instance, and calculating the fee for use of the network slice instance based on the data and the charging rule. For details, further refer to subsequent embodiments in this application.

Figure 2:
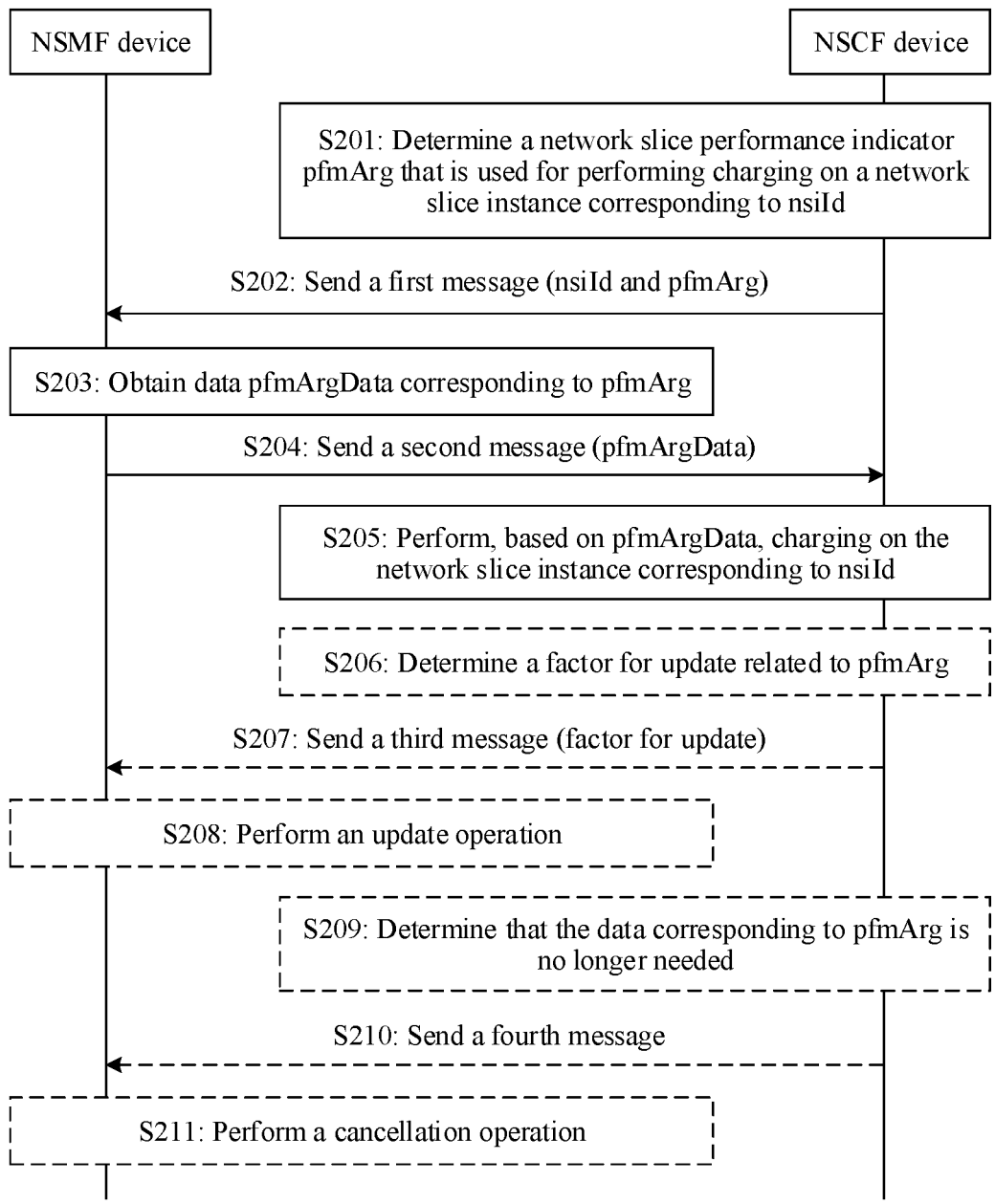
FIG. 2 is a flowchart of a method for performing charging on a network resource according to an embodiment of this application.

FIG. 2 is a flowchart of a method for performing charging on a network resource according to an embodiment of this application. The method is implemented based on the architecture in FIG. 1. In the method, an NSMF device corresponds to the NSMF device 102 in FIG. 1, and an NSCF device corresponds to the NSCF device 101 in FIG. 1. The method specifically includes the following steps.

Step 201: The NSCF device determines a network slice performance indicator pfmArg that is used for performing charging on a network slice instance corresponding to nsiId.

This step is optional. The network slice performance indicator pfmArg may be determined or obtained by the NSMF device in a subsequent step.

Specifically, before performing charging on a network slice instance (it is assumed that an identifier of the network slice instance is nsiId), the NSCF device may determine a network slice performance indicator pfmArg that is used for performing charging on the network slice instance. For example, the NSCF device may obtain the network slice performance indicator from subscription information related to subscription to the network slice instance by a customer, or may obtain the network slice performance indicator from configuration information preset by an operator. A manner of obtaining the network slice performance indicator by the NSCF device is not limited in the embodiments of this application.

It may be understood that when the customer subscribes to or uses a plurality of network slice instances, the NSCF device may need to perform charging on the plurality of network slice instances. In this step, different network slice performance indicators of the plurality of network slice instances may be determined (considering that types of different network slice instances may be different, and correspondingly, network slice performance indicators may also be different). Therefore, a quantity of network slice instances is not limited in the embodiments of this application. However, for ease of description, in the embodiments of this application, a single network slice instance is taken as an example for description.

It may be further understood that, when the single network slice instance is taken as an example, based on a requirement of the customer or the operator or a type of the single network slice instance, either only a single network slice performance indicator or a plurality of network slice performance indicators may be used in performing charging on the single network slice instance. Therefore, a quantity of network slice performance indicators is not limited in the embodiments of this application. However, for ease of description, in the embodiments of this application, a single network slice performance indicator is mainly taken as an example for description.

Step 202: The NSCF device sends a first message to the NSMF device, where the first message includes nsiId and pfmArg.

Specifically, the NSCF device includes an identifier nsiId of the network slice instance and the network slice performance indicator pfmArg in the first message, and sends the first message to the NSMF device, to request the NSMF device to provide data corresponding to the network slice indicator pfmArg of the network slice instance. The network slice performance indicator pfmArg is an optional parameter, and may be a name of the network slice performance indicator. When the first message does not include the parameter, the NSMF device determines the parameter. The identifier nsiId of the network slice instance may be s-NSSAI (single network slice selection assistance information) of the network slice instance, or may be other information used to identify the network slice instance. This is not limited in the embodiments of this application. For ease of description, in the embodiments of this application, s-NSSAI is taken as an example for description. Details are not described below.

Optionally, the NSCF device may further include an address for receiving data in the first message, so that the NSMF device may subsequently send, to the NSCF device based on the address, the data corresponding to the network slice indicator of the network slice instance. Optionally, the NSCF device may further include a time range for providing statistics in the first message, so that the NSMF device provides statistics on one or more values of the network slice performance indicator pfmArg within the time range, to obtain a statistics value of the network slice performance indicator. The time range for providing statistics can be determined based on the subscription information of the customer or an account balance of the customer. This is further separately described in subsequent embodiments of this application.

Optionally, the NSCF device may further include a method for providing statistics in the first message, so that the NSMF device provides statistics on the one or more values of the network slice performance indicator in the time range for providing statistics by using the method for providing statistics, to obtain the statistics value of the network slice performance indicator.

The first message may be a subscription request message. The subscription request message is used to request the NSMF device to create a subscription resource for the network slice instance. The subscription resource is used to manage a subscription (including querying, updating, and deleting the subscription). The subscription resource has a unique identifier, and the identifier may be generated by the NSMF device based on the subscription request message when the NSMF device receives the subscription request message, or may be carried in the subscription request message after the NSCF device generates the identifier. The NSMF device obtains, based on the subscription resource, the data corresponding to the network slice performance indicator, and generates and sends the subscription notification message. The NSMF device may send the subscription notification message to the NSCF device based on the address for receiving data.

It may be understood that when the NSCF device needs to perform charging on a plurality of network slice instances, the first message may include a plurality of network slice instance identifiers and one or more corresponding network slice performance indicators.

It may be further understood that when the NSMF device maintains a correspondence between the customer and the network slice instance of the customer, nsiId may be replaced with a customer identifier, or may be replaced with a combination of the customer identifier and a network slice instance identifier corresponding to the customer identifier.

Step 203: The NSMF device obtains the data pfmArgData corresponding to the network slice performance indicator.

Specifically, after receiving the first message, the NSMF device obtains, based on nsiId and pfmArg in the first message, the data pfmArgData corresponding to the network slice performance indicator pfmArg in the network slice instance whose identifier is nsiId. If the first message does not include pfmArg, the NSMF device determines pfmArg, and the NSMF device may determine pfmArg based on the subscription information of the customer or the configuration information preset by the operator. Optionally, the NSMF device may start a periodically running or continuously running task to obtain the data.

pfmArgData may be the statistics value of the network slice performance indicator whose indicator name is pfmArg, or may be a sampling value of the network slice performance indicator, or a combination of a sampling value and a sampling time that are of the network slice performance indicator. This is further separately described in subsequent embodiments of this application.

Optionally, the statistics value may be a result obtained by the NSMF device by providing statistics on a value of the network slice performance indicator whose indicator name is pfmArg within the time range for providing statistics. Alternatively, the statistics value may be a result obtained by the NSMF device by providing, according to the method for providing statistics, statistics on the value of the network slice performance indicator whose indicator name is pfmArg within the time range for providing statistics. This is further described in subsequent embodiments of this application.

It may be understood that, after receiving the first message, the NSMF device correspondingly returns a response message for the first message.

Step 204: The NSMF device sends a second message to the NSCF device, where the second message includes pfmArgData.

Specifically, the NSMF device uses the second message to carry pfmArgData obtained in step 203, and sends the second message to the NSCF device.

Optionally, the NSMF device may send pfmArgData to the NSCF device based on the address for receiving data in step 202.

It may be understood that if the first message is a subscription message, the second message is a subscription notification message.

Step 205: The NSCF device performs, based on pfmArgData, charging on the network slice instance corresponding to nsiId.

Specifically, after receiving the second message, that the NSCF device performs, based on the data pfmArgData corresponding to the network slice performance indicator that is provided by the NSMF device and that is included in the second message, charging on the network slice instance whose identifier is nsiId specifically includes: generating a network slice charging data record based on pfmArgData, or directly calculating a fee for use of the network slice instance based on pfmArgData. pfmArgData may be the statistics value, or may be the sampling value or the combination of the sampling value and the sampling time.

When pfmArgData is the combination of the sampling value and the sampling time of pfmArg, the NSCF device may write each group of combinations of the sampling value and the sampling time into a data record (e.g., a first charging data record) of the network slice instance corresponding to nsiId, and subsequently perform fee calculation based on the first data record. Alternatively, the NSCF device may further determine a corresponding time range for providing statistics and a method for providing statistics, provide statistics on a plurality of combinations of the sampling value and the sampling time in the indicator sampling value charging data record according to the method for providing statistics, to obtain the statistics value of pfmArg, and further calculate the fee for use of the network slice instance corresponding to nsiId by using the statistics value.

When pfmArgData is the statistics value of pfmArg, the NSCF device may write the statistics value into a data record (e.g., a second charging data record) of the network slice instance corresponding to nsiId, and subsequently perform fee calculation based on the second data record. Alternatively, the NSCF device may directly calculate the fee for use of the network slice instance corresponding to nsiId by using the statistics value.

Table 2 shows the charging process and a corresponding example application scenario.

the customer. Calculation of the fee for use of the network slice instance is further described in subsequent embodiments of this application.

It may be understood that, after receiving the second message, the NSCF correspondingly returns a response message of the second message.

Step 206: The NSCF device determines a factor for update related to pfmArg.

This step is optional. Specifically, when receiving subscription update information of the customer or the like, the NSCF device may determine the factor for update related to the network slice performance indicator pfmArg. The factor for update includes but is not limited to a change of the time range for providing statistics, a change of the method for providing statistics, a change of the network slice performance indicator, and the like.

Step 207: The NSCF device sends a third message to the NSMF device, where the third message includes the factor for update.

This step is optional. Specifically, after determining the factor for update, the NSCF device may send the factor for update to the NSMF device by using the third message, so that the NSMF device performs a corresponding change based on the third message, to meet a requirement of the NSCF device for subsequently performing charging.

It may be understood that if the first message is the subscription message, the third message is a subscription update request message for a subscription resource. The

TABLE 2

| Value of pfmArgData | Adoptable operation | Example application scenario |
| --- | --- | --- |
| Statistics value of an indicator pfmArg within a time range for providing statistics | An NSCF device generates or obtains a charging data record for statistics value of the indicator, and stores the statistics value in the charging data record; and Subsequently, the NSCF device or another network entity calculates a fee for use of a network slice instance based on the statistics value in the charging data record. | Offline charging scenario Postpaid charging scenario |
| Statistics value of an indicator pfmArg within a time range for providing statistics | An NSCF device calculates a fee for use of a network slice instance based on the statistics value | Online charging scenario Prepaid charging scenario |
| Sampling value and sampling time of an indicator pfmArg | An NSCF generates or obtains a charging data record for sampling value of the indicator, and stores the sampling value and the sampling time in the charging data record; and Subsequently, the NSCF device or another network entity calculates a corresponding statistics value based on the sampling value in the charging data record, and calculates a fee for use of the network slice instance based on the statistics value. | Offline charging scenario Postpaid charging scenario |

Optionally, the NSCF device may first obtain a related charging rule, and then calculate the fee for use of the network slice instance according to the charging rule and the statistics value. For example, it is assumed that the charging rule configured by the operator for a network slice template is "if accumulated end-to-end latency exceeds 50 ms for more than 10 times, a monthly rental is reduced by half". If pfmArg is "latency", and the statistics value of pfmArg is "11 times", use of the network slice instance is charged at a charging rate of 50%. Optionally, the NSCF device may obtain the charging rule from the subscription information of subscription update request message is used to update the subscription resource. The subscription update request message includes any one or any combination of a target time range for providing statistics, a target interval time, a target method for providing statistics, or a target network slice performance indicator.

Step 208: The NSMF device performs an update operation.

This step is optional. Specifically, the NSMF device receives the third message, and performs the update operation based on the factor for update in the third message, for example, adjusts the time range for providing statistics or changes the method for providing statistics.

After performing the update operation, the NSMF device sends, to the NSCF device, the data that corresponds to the network slice performance indicator and that exists before the update operation.

It may be understood that, after receiving the third message, the NSMF device correspondingly returns a response message of the third message.

If the first message is the subscription message, the NSMF device sends, to the NSCF device, the data that corresponds to the network slice performance indicator and that exists before the subscription resource is updated. Specifically, the NSMF device may add, to a response message of the subscription update request message, the data that corresponds to the network slice performance indicator and that exists before the subscription resource is updated. Alternatively, the response message of the subscription update request message does not carry the data that corresponds to the network slice performance indicator and that exists before the subscription resource is updated, but after sending the response message, the NSMF device sends, to the NSCF device, a notification message that carries the data that corresponds to the network slice performance indicator and that exists before the subscription resource is updated.

Step 209: The NSCF device determines that the data corresponding to pfmArg is no longer needed.

This step is optional. Specifically, when it is determined that the subscription of the customer is about to expire or has expired, the NSCF device may determine that the data corresponding to pfmArg is no longer needed.

Step 210: The NSCF device sends a fourth message to the NSMF device.

This step is optional. Specifically, after determining that the data corresponding to pfmArg is no longer needed, the NSCF device may send the fourth message to the NSMF device, to indicate to the NSMF device that the data corresponding to pfmArg is no longer needed.

If the first message is the subscription message, the fourth message is an unsubscription request message related to the subscription resource.

Step 211: The NSMF device performs a cancellation operation.

This step is optional. Specifically, the NSMF device receives the fourth message, and performs the cancellation operation, for example, stops or deletes a task created for obtaining the data corresponding to pfmArg.

It may be understood that, after receiving the fourth message, the NSMF correspondingly returns a response message of the fourth message.

If the first message is the subscription message, the NSMF device sends, to the NSCF device, the data that corresponds to the network slice performance indicator and that exists before unsubscription related to the subscription resource. Specifically, the NSMF device may add, to a response message of the unsubscription request message, the data that corresponds to the network slice performance indicator and that exists before unsubscription related to the subscription resource. Alternatively, the response message of the unsubscription request message does not carry the data that corresponds to the network slice performance indicator and that exists before unsubscription related to the subscription resource, but after sending the response message, the NSMF device sends, to the NSCF device, a notification message that carries the data that corresponds to the network slice performance indicator and that exists before unsubscription related to the subscription resource.

Compared with a conventional linear charging method that is merely based on terminal service data (such as traffic or duration), in the method for performing charging on a network slice instance in FIG. 2, charging on the network slice instance may be performed based on the data corresponding to the network slice performance indicator. Because the data corresponding to the network slice performance indicator is concerned about by the customer and can better reflect an investment of the operator, this method helps improve a matching degree between a charging result and a network resource investment, so as to help implement diversified application scenarios, and further help improve network resource utilization rate or quality of service of a network service.

Figure 3:
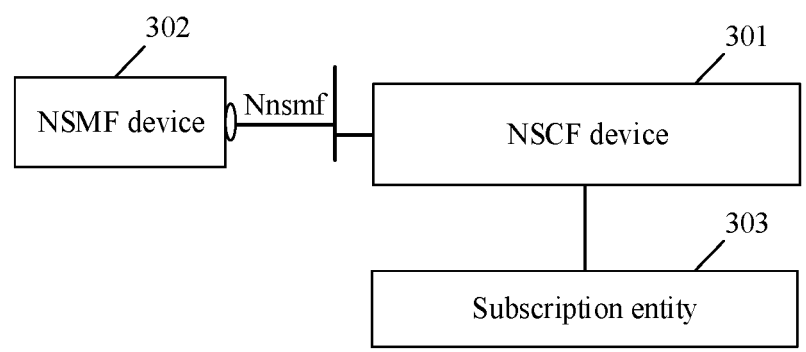
FIG. 3 is an architectural diagram of another charging system according to an embodiment of this application.

FIG. 3 is an architectural diagram of another charging system according to an embodiment of this application. The charging system includes an NSCF device 301 (corresponding to the NSCF device 101 in FIG. 1), an NSMF device 302 (corresponding to the NSMF device 102 in FIG. 1), and a subscription entity 303. Brief functions of the NSCF device 301, the NSMF device 302, and the subscription entity 303 are separately described as follows.

The NSCF device 301 is deployed on a convergent charging server or deployed independently, and is configured to obtain information about a network slice instance and subscription information of a customer from the subscription entity 303, determine a network slice performance indicator, a time range for providing statistics, and a method for providing statistics based on the subscription information, subscribe to, from the NSMF device 302, data corresponding to the network slice performance indicator of the network slice instance, and perform charging on the network slice instance based on the data and the subscription information.

It may be understood that the NSMF device may send the information about the network slice instance to the NSCF device via the subscription entity, or the NSMF device may directly send the information about the network slice instance to the NSCF device, for example, an identifier of the network slice instance, a creation time of the network slice instance, and a current status (for example, created or activated) of the network slice instance.

The NSMF device 302 is configured to provide the NSCF device 301 with the data corresponding to the network slice performance indicator of the network slice instance, including a sampling value or a statistics value of the indicator.

The subscription entity 303 is configured to receive a network slice subscription request from a terminal of the customer, notify the NSMF device 302 to enable the network slice instance, and send the subscription information and the information about the network slice instance to the NSCF device 301, so that the NSMF device 301 can perform charging on the network slice instance. The subscription entity 303 is a functional module, and may be deployed on a CRM (customer relationship management) server, or may be deployed on another device.

Figure 4A:
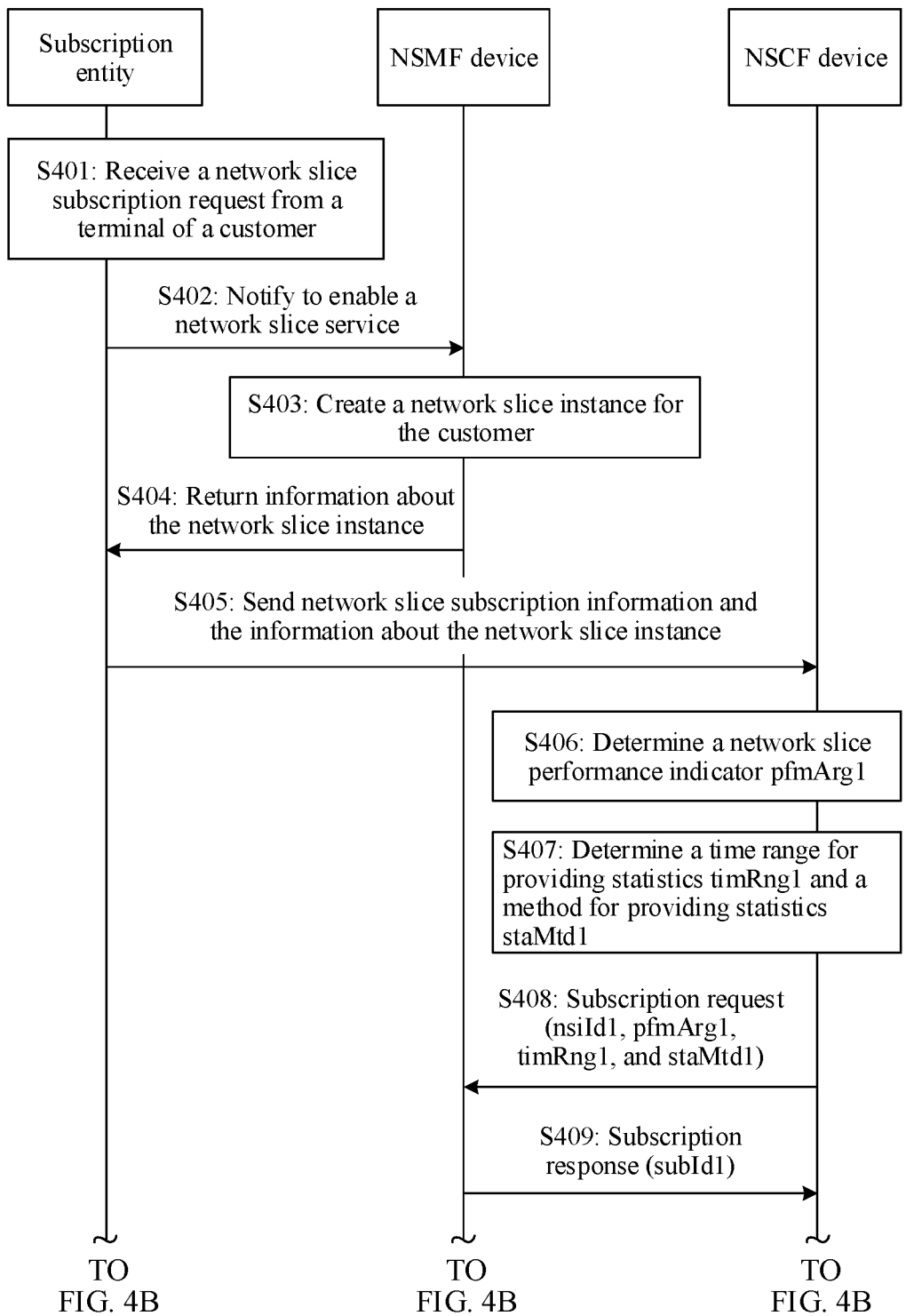
FIG. 4A and FIG. 4B are a flowchart of another method for performing charging on a network resource according to an embodiment of this application.
Figure 4B:
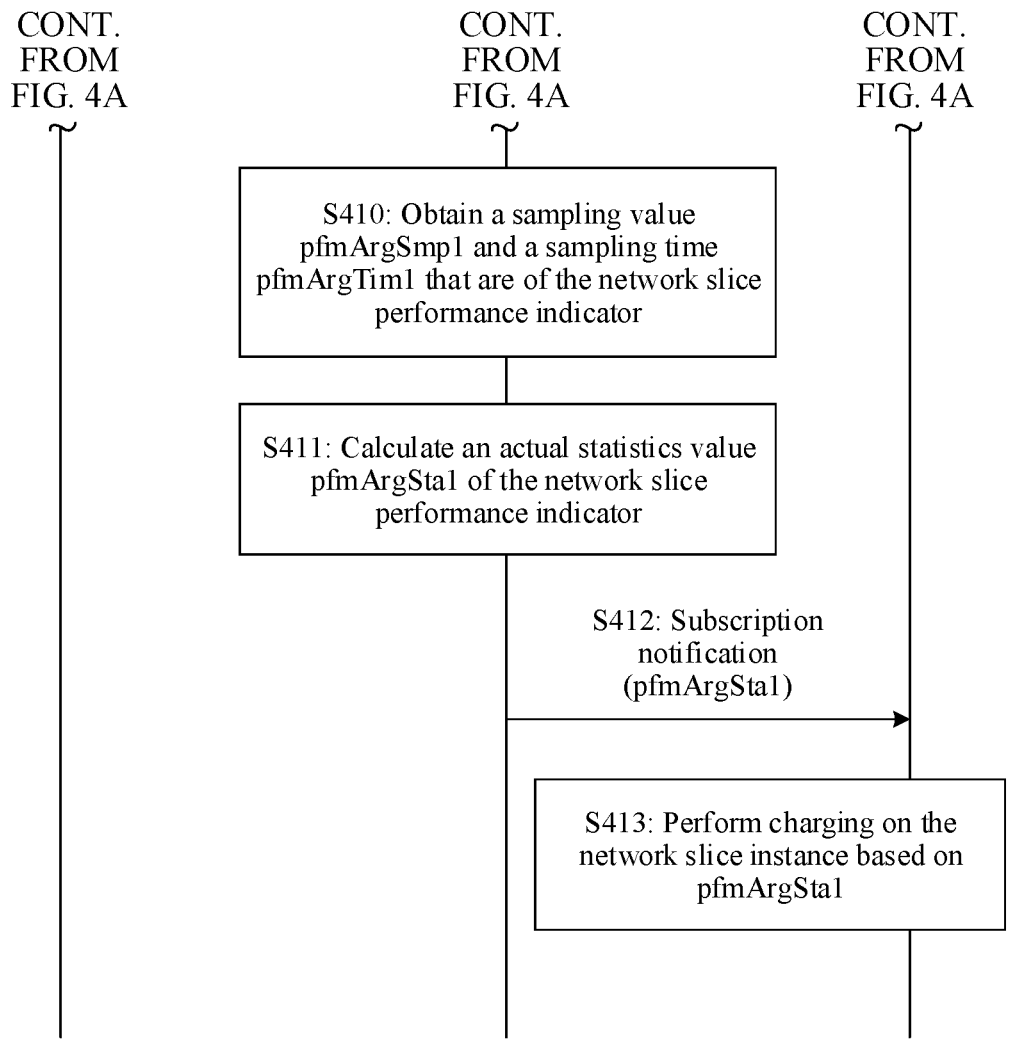

FIG. 4A and FIG. 4B are a flowchart of another method for performing charging on a network resource according to an embodiment of this application. The method is implemented based on the architecture shown in FIG. 3. In the method, an NSMF device corresponds to the NSMF device 302 in FIG. 3, an NSCF device corresponds to the NSCF device 301 in FIG. 3, and a subscription entity corresponds to the subscription entity 303 in FIG. 3. In the method, the NSMF device is responsible for providing statistics and transmitting a statistics value of a network slice performance indicator to the NSCF device, and then the NSCF device performs charging on a network slice instance based on the statistics value. The method specifically includes the following steps.

Step 401: The subscription entity receives a network slice subscription request from a terminal of a customer.

Specifically, the customer (assuming that an identifier of the customer is "1381234567") may submit the network slice subscription request to the subscription entity by using a terminal (for example, a mobile phone terminal or a notebook computer, by using a browser, or by using another channel) of the customer. The subscription request includes requirement information of the customer for network performance of a network slice, the requirement information may include a network slice type, a network slice performance indicator requirement, and the like.

The subscription entity may provide a plurality of network slice types, so that the network slice types are displayed on a customer terminal for the customer to select. For example, the subscription entity may provide three types for the customer to select: an eMBB type (a small quantity of devices but a high bandwidth requirement), a URLLC type (an extremely low end-to-end latency is required), and an mMTC type (a small bandwidth but a large quantity of devices).

When the customer subscribes to a network slice instance, the customer may further specify a constraint condition (the value in the condition may be a specific value or a range value) of a network slice performance indicator. For example, if the customer selects a network slice of the eMBB type, the customer may further specify that a bandwidth of the network slice instance is higher than 1000 G. If the customer selects a network slice of the URLLC type, the customer may further specify that a maximum latency of the network slice instance is less than 5 milliseconds. If the customer selects a network slice of the eMTC type, the customer may further specify that a quantity of concurrent PDU sessions of the network slice instance is greater than 1 million. The foregoing "bandwidth", "a maximum latency", and "quantity of concurrent PDU sessions" are all network slice performance indicators.

It may be understood that when the network performance of the network slice needs to be described by using a plurality of indicators, the customer may specify a constraint condition corresponding to each network slice performance indicator. For ease of description, in the embodiments of this application, one indicator is taken as an example for description.

Optionally, to improve customer experience, the subscription entity may further provide a network slice template for the customer to select or a network slice template serves as a basis for the customer to modify. A network slice type may have a plurality of network slice templates, and each network slice template has a preset constraint condition of a network slice performance indicator. For example, a network slice template may be:

network slice template 1{
  "slice type": "eMTC"
  "constraint condition": "a quantity of concurrent sessions is greater than 1 million"
}

The customer may select the foregoing template, and modify, based on the foregoing template, a network slice requirement that matches a service operated by the customer. For example, the template is modified to:

network slice instance {
  "slice type": "eMTC"
  "constraint condition": "a quantity of concurrent sessions is greater than 500 thousand"
}

Further, the customer determines a charging rule corresponding to the network slice instance. The charging rule includes a charging method corresponding to a statistics value of the network slice performance indicator. The following are examples for different statistics values.

(1) There may be a case in which the statistics value is a fulfillment degree. For example, for the network slice performance indicator "bandwidth", if the customer specifies that the constraint condition of the bandwidth is "monthly average bandwidth reaches 100 M/s", but an actual average bandwidth value is 88 M/s, the fulfillment degree is 88/100=0.88, and 0.88 is the fulfillment degree of the indicator "bandwidth". Table 3 shows an example of a correspondence between the fulfillment degree and the charging method.

TABLE 3

| Fulfillment degree | Charging method (Charging rate) | Meaning |
| --- | --- | --- |
| 0.95-1 | 0.9 | If the fulfillment rate is between 0.95 and 1, a charging rate of 0.9 is used |
| 0.85-0.95 | 0.8 | If the fulfillment rate is between 0.85 and 0.95, a charging rate of 0.8 (20% discount) is used |
| Less than 0.85 | 0.5 | If the fulfillment degree is less than 0.85, a charging rate of 0.5 (50% discount) is used |

In addition to the foregoing form, the correspondence between the fulfillment degree and the charging method may alternatively be in a form of an expression, a formula, or a function, but is essentially a mapping relationship or a correspondence.

(2) There may be a case in which the statistics value is non-fulfillment duration. For example, for the network slice performance indicator end-to-end latency, the customer specifies that a constraint condition is "end-to-end latency is less than 5 ms in an entire process", but accumulated duration that the end-to-end latency is greater than 5 ms (non-fulfillment) achieves 100 hours, and the 100 hours are the non-fulfillment duration. Table 4 shows a correspondence between the non-fulfillment duration and the charging method.

TABLE 4

| Non-fulfillment duration | Charging method (Charging rate) | Meaning |
| --- | --- | --- |
| 0-15 | 0.9 | If the non-fulfillment duration is within 15 hours, a charging rate of 0.9 (10% discount) is used. |
| 15-30 | 0.7 | If the non-fulfillment duration is within 15 to 30 hours, a charging rate of 0.7 (30% discount) is used. |
| >30 | 0.3 | If the non-fulfillment duration is more than 30 hours, a charging rate of 0.4 (60% discount) is used. |

Similarly, the correspondence between the non-fulfillment duration and the charging method may alternatively be in a form of an expression, a formula, or a function.

(3) There may be a case in which the statistics value is accumulated quantity of non-fulfillment times. For example, for the network slice performance indicator end-to-end latency, the customer specifies that a constraint condition is "end-to-end latency is less than 5 ms in an entire process", but actual accumulated occurrence times that the end-to-end latency is greater than 5 ms reaches 60, and the 60 are the accumulated quantity of non-fulfillment times. The correspondence between the accumulated quantity of non-fulfillment times and the charging method may be similar to the correspondence between the fulfillment degree and the charging method, and is not further described.

The charging rule is merely an example. In the embodiments of this application, another charging rule in which charging is performed based on a value of the network slice performance indicator is not excluded.

After the customer determines the charging rule and selects a subscription period (namely, a time range in which the network slice instance is to be used or a charging period of the network slice instance, which is usually a range of time), the subscription entity may create and store network slice subscription information. An example is as follows:
network slice subscription information {
    "customer identifier": "1381234567";
    "slice type": "eMBB"
    "subscription time": "20180115120000"
    "subscription period": "month"
    "constraint condition": "average bandwidth is greater than 100 M/s"
    "charging rule": " . . . "
}

A value of a "charging rule" field may be a text character string converted from the charging rule (for example, the content in Table 3), and the character string may be in an XML (extensible markup language) format, a JSON (JavaScript object notation) format, or another text format, or may be a computer-executable script, or may be data in a binary format converted from the charging rule (for example, the content in Table 2). This is not limited in the embodiments of this application.

It may be noted that the customer described in the embodiments of this application may be an industry customer or an enterprise customer that has a plurality of user equipments, for example, a bicycle sharing enterprise or a taxi company, or may be a natural person customer, which is referred to as a customer in the embodiments of this application for ease of description.

Step 402: The subscription entity notifies the NSMF device to enable a network slice service.

Specifically, the subscription entity may send, to the NSMF device, a slice service enabling notification. The slice service enabling notification may include the slice type and the constraint condition in the network slice subscription information, so that the NSMF device creates a network slice instance that meets a requirement of the customer.

Optionally, the subscription entity may further include a customer identifier in the slice service enabling notification, so that the NSMF device subsequently establishes a correspondence between the created network slice instance and the customer identifier.

Step 403: The NSMF device creates the network slice instance for the customer.

Specifically, the NSMF device receives the network slice enabling notification from the subscription entity, creates a corresponding network slice instance based on the network slice type and the constraint condition in the notification, and allocates a unique identifier, namely, a network slice instance identifier, to the corresponding network slice instance.

Optionally, the NSMF device may allocate the newly created network slice instance to the customer, in other words, establish a correspondence between the network slice instance identifier and the customer identifier.

It may be understood that the NSMF device may alternatively check whether a network slice instance that can meet a requirement of the customer exists in a network. If it is determined that the network slice instance exists and can be allocated to the customer, the NSMF device may directly allocate the existing network slice instance to the customer. In this way, a process of creating a new network slice instance can be omitted.

Optionally, the NSMF device may obtain the customer identifier from the network slice notification message.

Step 404: The NSMF device returns information about the network slice instance to the subscription entity.

Specifically, the NSMF device may return a network slice enabling response to the subscription entity. The response may include information indicating that the network slice is successfully created and the information about the network slice instance, and the information may include the network slice instance identifier and the creation time of the network slice instance.

Step 405: The subscription entity sends the network slice subscription information and the information about the network slice instance to the NSCF device.

Specifically, the subscription entity may send a subscription information notification to the NSCF device, and the notification includes the network slice subscription information in step 401 and the information about the network slice instance in step 404.

Step 404 and step 405 may be understood as that the NSMF device may send the information about the network slice instance to the NSCF device via the subscription entity. Optionally, the NSMF device may directly send the information about the network slice instance to the NSCF device, for example, an identifier of the network slice instance, the creation time of the network slice instance, and the current status (for example, created or activated) of the network slice instance.

Step 406: The NSCF device determines a network slice performance indicator pfmArg1.

Specifically, after receiving the subscription information notification, the NSCF device may determine the network slice performance indicator pfmArg1 based on the slice type and/or the constraint condition included in the subscription information notification.

For example, if the subscription information is as follows:
network slice subscription information {
    "customer identifier": "1381234567";
    slice type: eMBB
    "network slice instance creation time": "20180115120000"
    "subscription period": "month"
    "constraint condition": "average bandwidth is greater than 100 M/s"
    "charging rule": " . . . "
}

Content of the field "charging rule" may include the charging method corresponding to the indicator satisfaction situation described in step 401.

In this case, the NSCF device may determine, based on the constraint condition or the charging rule in the network slice subscription information, that the network slice performance indicator that is used for performing charging is the "average bandwidth".

Similar to step 201, this step is optional, and the subscription indicator pfmArg1 may also be determined by the NSMF device in a subsequent step by using a method similar to this step.

Step 407: The NSCF device determines a time range for providing statistics timRng1 or a method for providing statistics staMtd1.

Optionally, the NSCF device may determine the time range for providing statistics timRng1 and the method for providing statistics staMtd1 of the network slice performance indicator based on any one or any combination of the network slice subscription information, the information about the network slice instance, information preconfigured by an operator, or account balance information of the customer. The following is an example.

The NSCF device may determine the time range for providing statistics timRng1 of the network slice performance indicator based on the "network slice instance creation time" field and the "subscription period" field in the network slice subscription information. For example, the NSCF device may determine a current charging period based on the "network slice instance creation time" field and the "subscription period" field, and use a time range corresponding to a current charging period as the time range for providing statistics, or may use a part of a time range (for example, February 2018) in the current charging period (for example, a first quarter of 2018) as the time range for providing statistics. Alternatively, the NSCF device may determine the time range for providing statistics timRng1 of the network slice performance indicator based on the account balance information of the customer. For example, the NSCF device may determine, based on the account balance information of the customer, that the customer may further use the network slice instance of the customer for a maximum of 60 days. In this case, the NSCF device may determine that the time range for providing statistics is within 60 days after a current time. The NSCF device may also determine the time range for providing statistics timRng1 based on the subscription information and the balance information. For example, the NSCF device may determine, based on the subscription information, that the time range for providing statistics is within 30 days after the current time, but because an account balance of the customer is insufficient for using the network slice instance for 30 days, for example, if only 15 days are available, the NSCF device may determine that the time range for providing statistics timRng1 is within 15 days after the current time.

Alternatively, the NSCF device may determine the time range for providing statistics based on a charging period (for example, first and last dates of a natural month) uniformly preconfigured by the operator for different network slice instances.

Alternatively, the NSCF device may determine the method for providing statistics staMtd1 based on a previously determined name of the network slice performance indicator. Taking the "average bandwidth" as an example, the NSCF device may determine, based on the name of the indicator, that the method for providing statistics is "calculating the average value", and an average bandwidth value is obtained by dividing a sum of bandwidth values detected or obtained for a plurality of times by the plurality of times.

Alternatively, the NSCF device may determine the method for providing statistics based on a parameter that is related to the method for providing statistics and that is preconfigured by the operator for each network slice performance indicator. Using the "average bandwidth" as an example, the operator may preconfigure a weight of a holiday bandwidth, and the NSCF device may determine that the method for providing statistics is "calculating a weighted average value", and use a weighted average value of bandwidth values detected for a plurality of times as the average bandwidth value.

The foregoing manner of determining the time range for providing statistics and the method for providing statistics is merely an example. A manner of determining the time range for providing statistics and the method for providing statistics by the NSCF device is not limited in the embodiments of this application.

Step 408: The NSCF device sends a subscription request to the NSMF device, where the subscription request includes nsiId1 and pfmArg1, and may further include timRng1 and staMtd1.

Specifically, the NSCF device includes one or more of nsiId1, pfmArg1, timRng1, and staMtd1 in the subscription request, and sends the subscription request to the NSMF device.

The parameters nsiId1 and pfmArg1 are respectively used to indicate that the NSMF device needs to obtain a statistics value of the network slice performance indicator corresponding to pfmArg1 of a network slice instance corresponding to nsiId1.

The parameters timRng1 and staMtd1 are optional and used to specify the time range for providing statistics and the method for providing statistics of the corresponding indicator, so that the NSMF device samples the indicator pfmArg1 within the time range for providing statistics indicated by timRng1, and provides statistics on a sampling value according to the method for providing statistics described by staMtd1, to obtain the statistics value. When neither timRng1 nor staMtd1 appears in the subscription request, the NSMF device determines the time range for providing statistics and the method for providing statistics.

Optionally, a form of the method for providing statistics staMtd1 in the subscription request message may be a form of a digital identifier or a character identifier (for example, "001" or "avrg" is used to represent "calculating an average value"), or may be a computer-executable script, code, a formula, a function, or the like. This is not limited in the embodiments of this application. Any form in which the NSMF device can determine the method for providing statistics to be used falls within the meaning of the solutions in the embodiments of this application.

Optionally, the NSCF device may further include, in the subscription request, an address for receiving a subscription notification, so that the NSMF device may subsequently send the subscription notification to the NSCF device based on the address.

Optionally, the NSCF device may further include the customer identifier in the subscription request message, so that the NSMF device subsequently determines an identifier of a corresponding network slice instance based on the customer identifier.

Optionally, the NSCF device may further include a condition for sending a notification in the subscription request message, so that the NSMF device subsequently sends a subscription notification to the NSCF device based on the condition, to meet a charging requirement. The condition for sending the notification includes any one or any combination of the following: a period or an interval time for sending the subscription notification, a specific time point for sending the subscription notification, triggering by a key event (for example, modification of the network slice instance subscribed by the customer, or an unexpected interruption), or the like.

The NSCF device may obtain an address of the NSMF device by querying a network register function (NRF) device, or may obtain the address of the NSMF device from locally preconfigured information, and send the subscription request to the address.

The following is an example structure of the subscription request message:

subscription:
{
  "nsiId": "s-NSSAI value",
  "cusId": "customer ID",
  "startTime": "start time of the statistical period",
  "endTime": "end time of the statistical period",
  "notificationURI": "notification message URI",
  "pfmArgArray": [
    {
      "pfmArg": "bandwidth",
      "stdMtd": "calculating the average value"
    }
  ]
}

Step 409: The NSMF device returns a subscription response to the NSCF device, where the subscription response includes subId1.

After receiving the subscription request, the NSMF device generates a subscription resource, allocates an identifier subId1 to the subscription resource, and returns the subscription response to the NSCF device, to indicate to the NSCF device that the subscription succeeds. The NSMF device includes the subscription identifier subId1 in the subscription response, so that the NSCF device can use the subscription identifier subId1 in subsequent processes such as requesting to update the subscription, requesting to unsubscribe to, and querying subscription information. For details, refer to subsequent embodiments of this application.

For the subscription request, the NSMF device obtains, in the specified time range (timRng1), the statistics value of the network slice performance indicator pfmArg1 of the network slice instance whose identifier is nsiId1 by using the specified method for providing statistics (staMtd1). When the subscription request does not include timRng1 or staMtd1, the NSMF device may determine the time range for providing statistics or the method for providing statistics based on the information preconfigured by the operator. For example, the preconfigured information may be set as follows: a default time range for providing statistics is from a first day of a natural month to a last day of the natural month, and the default method for providing statistics is to obtain an average value through a plurality of times of sampling.

Step 410: The NSMF device obtains a sampling value pfmArgSmp1 and a sampling time pfmArgTim1 of the network slice performance indicator.

Specifically, the NSMF device samples, at a preset time interval in the time range timRng1, a value of the network slice performance indicator pfmArg1 of the network slice instance whose identifier is nsiId1 for a plurality of times, to obtain a plurality of groups of sampling values pfmArgSmp1 and a corresponding sampling time pfmArgTim1.

Optionally, the NSMF device may alternatively obtain the time range timRng1 from configuration information preset by the operator. In this case, the NS CF device may not provide the timRng1 in step 408.

Optionally, in step 408, the subscription request message may further include an interval time, so that the interval time may be used to replace the preset time interval in this step.

Step 411: The NSMF device calculates a statistics value pfmArgSta1 of the network slice performance indicator.

Specifically, the NSMF device may provide, according to the method for providing statistics staMtd1 received in step 408, statistics on the plurality of groups of sampling values pfmArgSmp1 and the sampling time pfmArgTim1 obtained in step 410, or provide statistics according to the method for providing statistics determined by the NSMF device (in this case, the NSCF device may not need to provide staMtd1 in step 408), to obtain the statistics value pfmArgSta1. For example, the NSMF device may determine the method for providing statistics based on a name of pfmArg1. For details, refer to a manner of determining the method for providing statistics by the NSCF device in step 407.

It may be understood that the NSMF device may provide statistics at an end moment of the time range for providing statistics. An execution moment of the statistics providing operation of the NSMF device is not limited in the embodiments of this application.

Step 412: The NSMF device sends the subscription notification to the NSCF device, where the subscription notification includes pfmArgSta1.

Specifically, the NSMF device includes pfmArgSta1 in the subscription notification, and sends the subscription notification to the NSCF device. The NSMF device may send the subscription notification to the NSCF device based on the address that is sent by the NSCF device and that is for receiving the subscription notification.

Optionally, the NSMF device may further include the time range for providing statistics timRng1 in the subscription notification, so that the NSCF device determines that the statistics value pfmArgSta1 is a statistical result within the time range timRng1.

Step 413: The NSCF device performs charging on the network slice instance based on pfmArgSta1.

Specifically, after receiving the subscription notification from the NSMF device, the NSCF device performs, based on pfmArgSta1 in the subscription notification, charging on the network slice instance corresponding to nsiId1. This may be specifically one of the following processing manners.

(Manner 1): pfmArgSta1 is written into a charging data record.

Specifically, the NSCF device may create a charging data record for a corresponding customer or the network slice instance corresponding to nsiId1 (if the charging data record exists, the charging data record does not need to be created), and then write pfmArgSta1 into the charging data record.

Optionally, the NSCF device may further write nsiId1 and/or an identifier of the corresponding customer into the charging data record.

Optionally, the NSCF device may further correspondingly store the time range for providing statistics corresponding to pfmArgSta1 and pfmArgSta1 in the charging data record, and as shown in Table 5, the NSCF device may calculate a fee for use of the network slice instance based on different charging factors (for example, a discount provided in a discount activity) in different charging periods. The NSCF device may obtain the time range for providing statistics corresponding to pfmArgSta1 from the subscription notification, or may determine the time range for providing statistics corresponding to pfmArgSta1 based on time at which that the subscription notification is received.

Table 5 lists an example charging data record.

TABLE 5

Data record for storing a statistics value of an indicator

| Network slice instance identifier | nsiId1 | | |
|---|---|---|---|
| Customer identifier | 1381234567 | | |
| Start time | End time | Indicator name | Statistics value |
| 20181001 | 20181031 | Average bandwidth | 300 M |
| 20181001 | 20181031 | Maximum latency | 50 ms |

Optionally, the NSCF device may transmit the charging data record to a module or a network entity responsible for calculating a fee, and the module or the network entity calculates the fee for use of the network slice instance corresponding to nsiId1. The module or the network entity responsible for calculating the fee may be deployed on the NSCF device (equivalent to that the NSCF device may further calculate the fee for use of the network slice instance based on the charging data record of the statistics value of the indicator subsequently. For details, refer to the following manner 2), or may be deployed outside the NSCF device.

(Manner 2): The fee for use of the network slice instance is calculated based on pfmArgSta1.

Specifically, the NSCF device may calculate, based on the statistics value pfmArgSta1, the fee for use of the network slice instance corresponding to nsiId1.

The NSCF device may first obtain a charging rule chgPol1 corresponding to the network slice instance corresponding to nsiId1, and may specifically obtain the charging rule chgPol1 from the network slice subscription information in step 401, or may obtain the charging rule chgPol1 from the information preconfigured by the operator. A path for obtaining the charging rule by the NSCF is not limited in the embodiments of this application.

Based on pfmArgSta1 and chgPol1, the NSCF device may calculate the fee for use of the network slice instance corresponding to nsiId1. For example, assuming that the charging rule chgPol1 is shown in Table 4, the NSCF device may search Table 4 for a corresponding charging method or charging rate according to a specific value of pfmArgSta1, to calculate the fee for use of the network slice instance.

In the method for performing charging on a network resource in FIG. 4A and FIG. 4B, a subscription-notification mechanism is used, the NSMF device completes sampling and statistics providing of the network slice performance indicator, and the NSCF device completes charging based on the statistics value. An advantage of this method is that the sampling value of the network slice performance indicator does not need to be frequently transferred between the NSMF device and the NSCF device. Therefore, occupation of a communication bandwidth between the NSMF device and the NSCF device can be reduced, and calculation burden on an NSCF device side can be reduced.

Figure 5A:
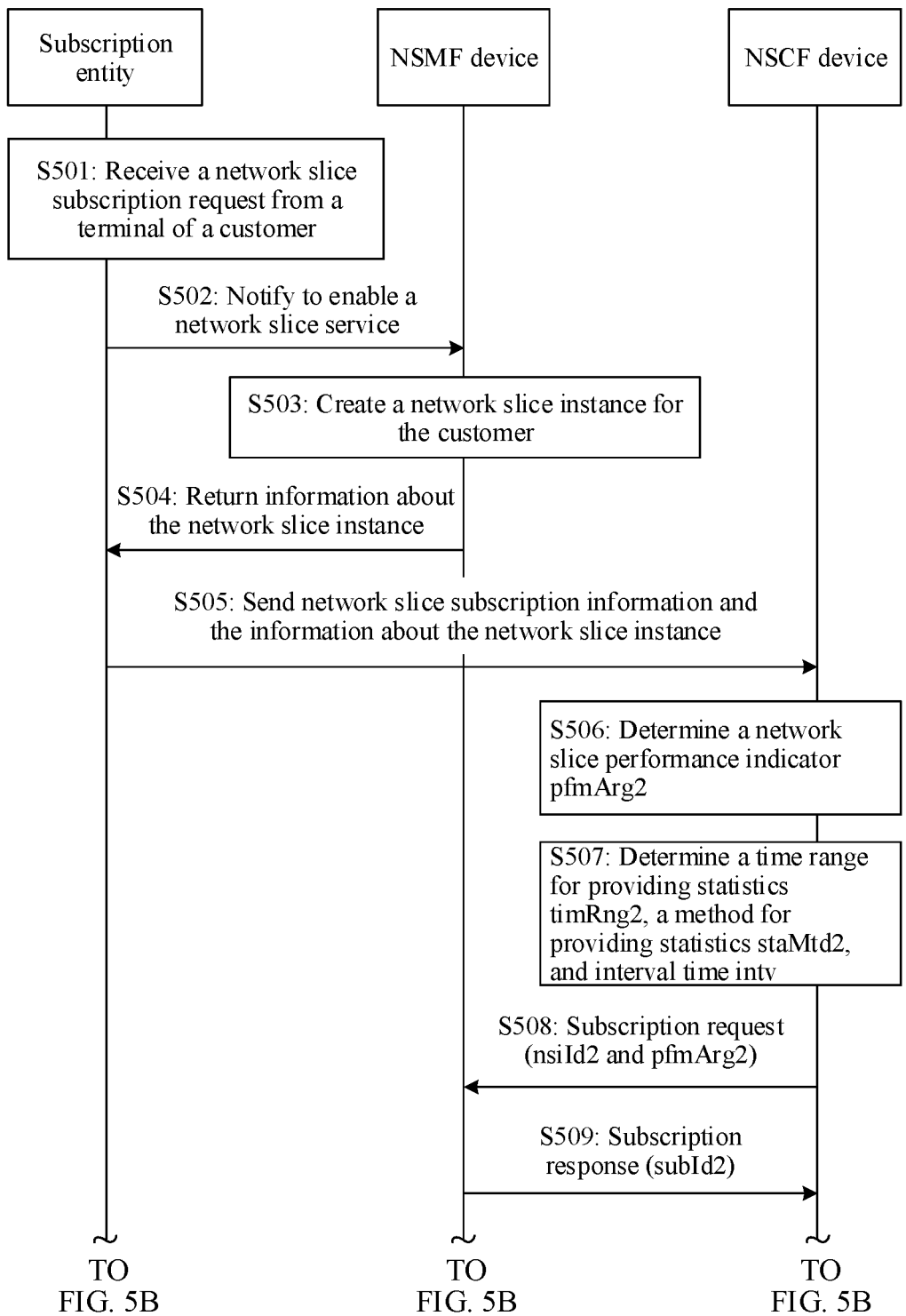
FIG. 5A and FIG. 5B are a flowchart of still another method for performing charging on a network resource according to an embodiment of this application.
Figure 5B:
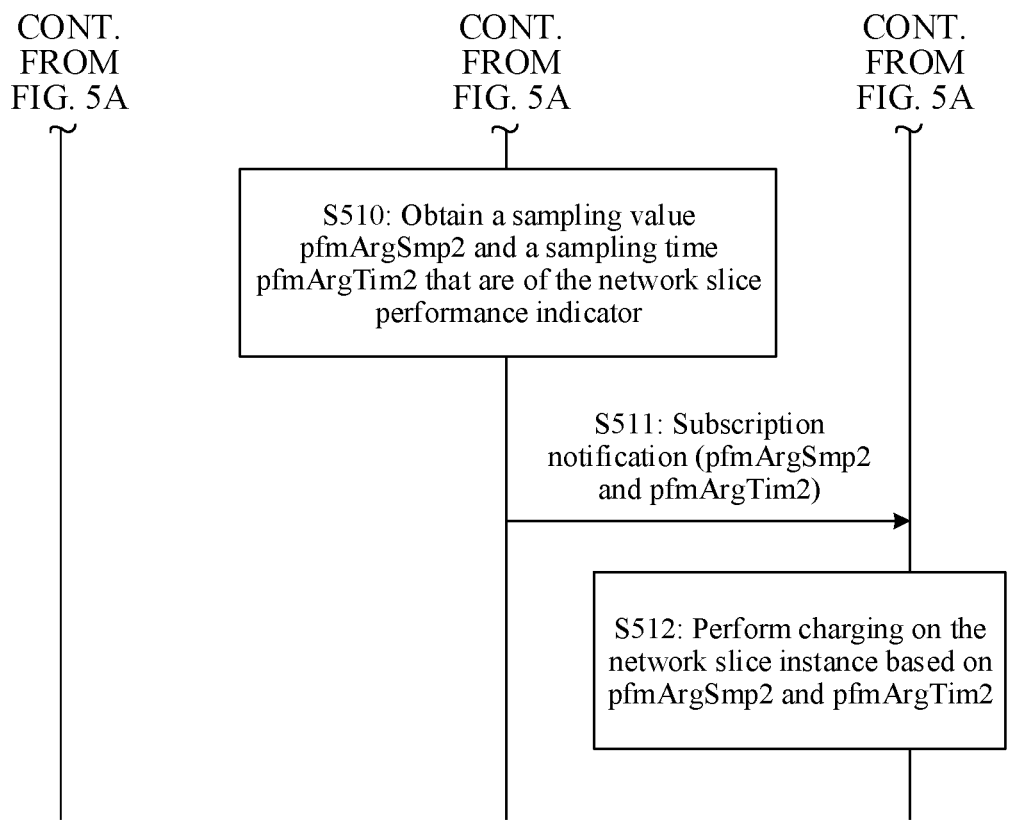

FIG. 5A and FIG. 5B are a flowchart of still another method for performing charging on a network resource according to an embodiment of this application. The method is also implemented based on the architecture shown in FIG. 3. In the method, an NSMF device corresponds to the NSMF device 302 in FIG. 3, an NSCF device corresponds to the NSCF device 301 in FIG. 3, and a subscription entity corresponds to the subscription entity 303 in FIG. 3. In the method, the NSMF device transmits a sampling value/sampling time (not a statistics value) of a network slice performance indicator to the NSCF device, and the NSCF device performs charging on a network slice instance based on the sampling value/sampling time. The method specifically includes the following steps.

Step 501 to step 506 are similar to step 401 to step 406. A difference lies in that a network slice instance identifier is changed to nsiId2, and a network slice performance indicator is changed to pfmArg2.

Step 507: The NSCF device determines a time range for providing statistics timRng2, a method for providing statistics staMtd2, and an interval time intv.

A method for determining timRng2 and staMtd2 is similar to step 407.

Optionally, the NSCF device may further determine the interval time intv, and include intv in the subscription request. The interval intv is used to indicate a time interval for the NSMF device to sample pfmArg2 (namely, a time interval between two consecutive times of sampling the indicator pfmArg2).

Optionally, the NSCF device may also determine timRng2, staMtd2, intv, and the like in a subsequent step, for example, in step 512.

Step 508: The NSCF device sends the subscription request to the NSMF device, where the subscription request includes nsiId2 and pfmArg2.

Optionally, the subscription request may further include intv.

This step is similar to step 408, but parameters included in the subscription request are different. To be specific, the NSCF device includes the network slice instance identifier nsiId2 and the network slice performance indicator pfmArg2 in the subscription identifier.

Optionally, the NSCF device may further include the interval time intv determined in step 507 in the subscription request, so that the NSMF device may determine a time interval for sampling the network slice performance indicator pfmArg2.

The following is an example structure of the subscription request message:

subscription:
{
　"nsi": "s-NSSAI value",
　"cusId": "customer ID",
　"notificationURI": "notification message URI",
　"argArray": [
　　{
　　　"kpi": "latency"
　　　"intv": "sampling interval time"
　　}
　]
}

Step 509: The NSMF device returns a subscription response to the NSCF device, where the subscription response includes subId2.

This step is similar to step 409.

Step 510: The NSMF device obtains a sampling value pfmArgSmp2 and a sampling time pfmArgTim2 of the network slice performance indicator.

This step is similar to step 410.

Optionally, the NSMF device records the sampling time pfmArgSmpTim2 corresponding to the sampling value pfmArgSmp2, and a value of the sampling time pfmArgSmpTim2 may be a specific time point, or may be a time period. For details, refer to a definition and example of the network performance indicator in the embodiments of this application.

Step 511: The NSMF device sends a subscription notification to the NSCF device, where the subscription notification includes pfmArgSmp2 and pfmArgTim2.

Specifically, the NSMF device includes pfmArgSmp2 in the subscription notification, and sends the subscription notification to the NSCF device. The NSMF device may send the subscription notification to the NSCF device based on the address that is sent by the NSCF device and that is for receiving the subscription notification.

Optionally, the NSMF device may also include the sampling time pfmArgTim2 in the subscription notification, so that the NSCF device learns of a sampling time corresponding to each sampling value pfmArgSmp2, to perform statistics providing.

Step 512: The NSCF device performs charging on the network slice instance based on pfmArgSmp2 and pfmArgTim2.

Specifically, after receiving the subscription notification from the NSMF device, the NSCF device performs, based on the sampling value pfmArgSmp2 of the network slice performance indicator pfmArg2 and the sampling time pfmArgTim2 of the network slice performance indicator pfmArg2, charging on the network slice instance corresponding to nsiId2. If the subscription notification does not include pfmArgTim2, the NSCF device may use a time at which the subscription notification is received as the sampling time pfmArgTim2.

That the NSCF device performs charging on the network slice instance corresponding to nsiId2 may be specifically: writing pfmArgSmp2 and pfmArgTim2 into a data record. For example, the NSCF device may create an indicator sampling value charging data record (if the indicator sampling value charging data record exists, the NSCF device does not need to create the indicator sampling value charging data record) for a corresponding customer or the network slice instance corresponding to nsiId2, and then correspondingly store pfmArgSmp2 and pfmArgTim2 in the charging data record. The NSCF correspondingly stores the sampling time pfmArgTim2 and pfmArgSmp2 in the charging data record. An advantage of this operation is that the NSCF device may subsequently determine whether each sampling value pfmArgSmp2 is within the time range for providing statistics timRng2 (or within a charging period).

Optionally, the NSCF device may further write nsiId2 and/or an identifier of the corresponding customer into the charging data record.

As an example, a form of the foregoing charging data record may be shown in Table 6.

Optionally, the NSCF device may transmit the charging data record to a module or a network entity responsible for calculating a fee, and the module or the network entity calculates a fee for use of the network slice instance corresponding to nsiId2. The module or the network entity responsible for calculating the fee may be deployed on the NSCF device, or may be deployed outside the NSCF device.

TABLE 6

Data record for storing a sampling value of an indicator

| | |
|---|---|
| Network slice instance identifier | nsiId2 |
| Customer identifier | 1381234567 |

| Sampling start time | Sampling end time | Indicator name | Sampling value |
|---|---|---|---|

TABLE 6-continued

Data record for storing a sampling value of an indicator

| | | | |
|---|---|---|---|
| 20181001-00:00:00 | 20181001-00:00:05 | Bandwidth | 298 M |
| 20181001-00:00:00 | 20181001-00:00:05 | Quantity of concurrent sessions | 1.23 million |

Subsequently, the NSCF device may read the sampling value within the time range for providing statistics timRng21 (or the charging period) from the charging data record, calculate a statistics value of the network slice performance indicator pfmArg2 according to the determined method for providing statistics staMtd2 by referring to the method in step 411, and further calculate the fee for use of the network slice instance corresponding to nsiId2 by referring to the method in step 413 (the manner 2). Therefore, the operation of obtaining or determining the time range for providing statistics timRng2 and the method for providing statistics staMtd2 in step 507 may alternatively be delayed before the statistics providing operation.

In the method for performing charging on a network slice instance in FIG. 5A and FIG. 5B, as a charging function device, the NSCF device collects a large amount of performance data of the network slice instance. This helps carry out a richer and more flexible charging service. For example, for a very important customer, a new method for providing statistics may be used to provide a new statistics value at a later stage, and the fee for use of the network slice instance is calculated based on the new statistics value and a new charging rule. As a network slice management device, the NSMF device only needs to be responsible for collecting/gathering the value of the network slice performance indicator, and does not need to involve a charging-related statistical operation. Therefore, calculation burden of the NSMF device may be reduced.

It can be learned from the several methods shown in FIG. 2, FIG. 4A and FIG. 4B, and FIG. 5A and FIG. 5B that the NSCF device may request the NSMF device to provide the sampling value of the network slice performance indicator, or may request the NSMF device to provide the statistics value of the network slice performance indicator. In a specific implementation, either of the two methods may be selected for implementation. Alternatively, in another specific implementation, both the two methods may be implemented at the same time, and a method for distinguishing between messages is provided. Specifically, when the two methods are implemented at the same time, there are two methods for distinguishing between messages. One method is to distinguish between messages based on a parameter in the message. For example, if the subscription message received by the NSMF device from the NSCF device includes the time range for providing statistics and/or the method for providing statistics, it may be determined that the NSCF device requests to provide the statistics value of the network slice performance indicator. In the other method, the first message or the subscription message may include an indication parameter, for example, argValType, used to indicate whether the NSCF device requests the NSMF device to provide the statistics value of the network slice performance indicator or the sampling value of the network slice performance indicator.

Considering external factors such as an update of subscription information of the customer, to better meet a charging requirement, the NSCF device can be enabled to notify the NSMF device to update a subscription resource.

Figure 6:
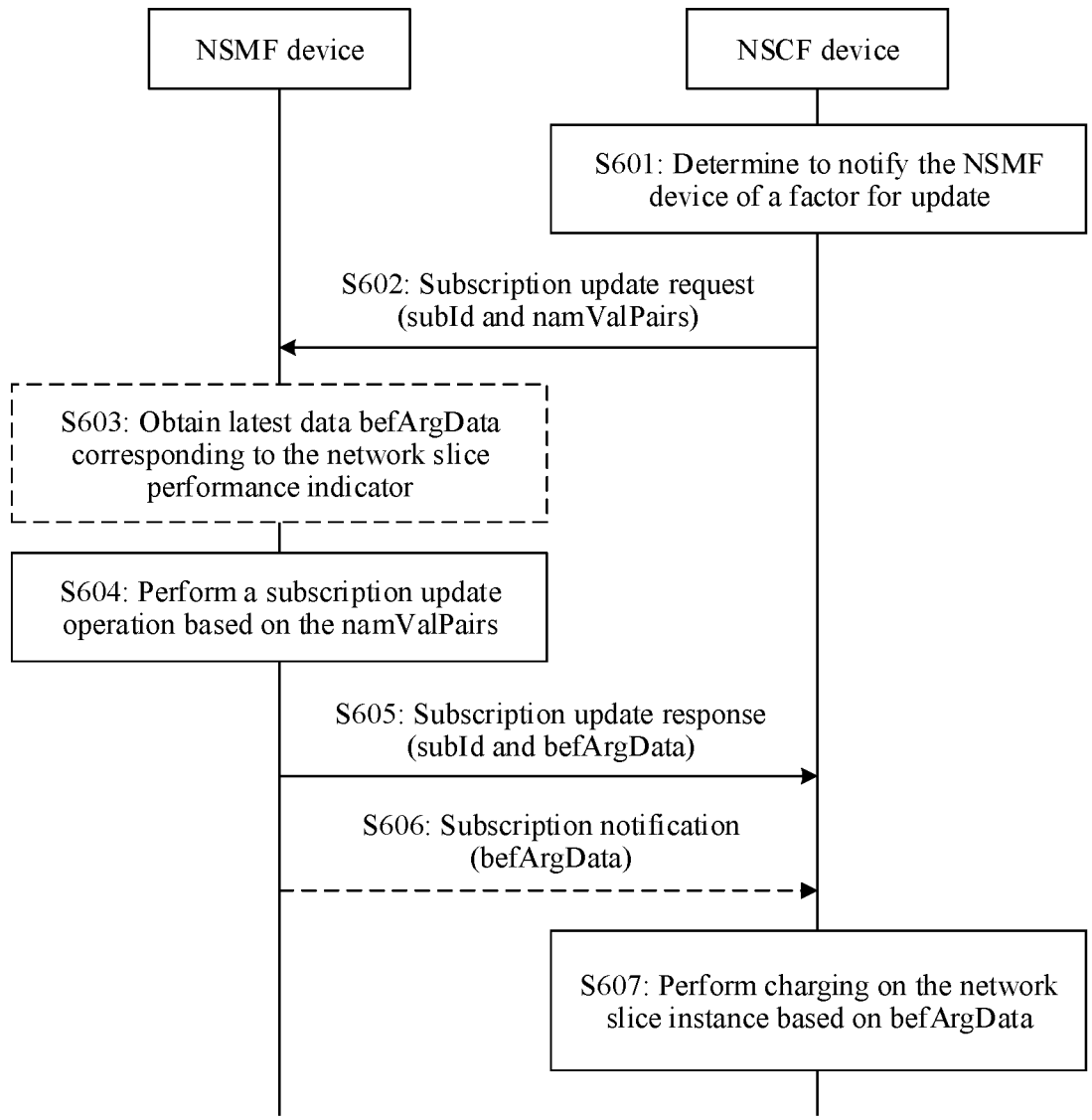
FIG. 6 is a flowchart of still another method for performing charging on a network resource according to an embodiment of this application.

FIG. 6 is a flowchart of still another method for performing charging on a network slice instance according to an embodiment of this application. The method is also implemented based on the architecture shown in FIG. 3. In the method, an NSMF device corresponds to the NSMF device 302 in FIG. 3, and an NSCF device corresponds to the NSCF device 301 in FIG. 3. In the method, the NSCF device may request the NSMF device to update a subscription based on an update of the subscription of a customer. The method specifically includes the following steps.

Step 601: The NSCF device determines to notify the NSMF device of a factor for update.

Specifically, the NSCF device determines to notify, based on the factor such as an update of subscription information that is of the customer and that is received from a subscription entity, or a change of an account balance of the customer, or the like, the factor for update to the NSMF device. The factor for update includes but is not limited to a network slice performance indicator, and a time range for providing statistics, a method for providing statistics, or a sampling interval time corresponding to the network slice performance indicator, and then a name-value pair list namValPairs is formed based on these factors for update. In each name-value pair, "name" is used to indicate, to the NSMF device, a corresponding change, and "value" is used to indicate a change result to the NSMF device.

For example, in the following name-value pair list, the "method for providing statistics" (corresponding to "staMtd") is changed to "calculating a maximum value (corresponding to "max"), and the "time range for providing statistics" (corresponding to "rngTim") is changed to 20181001-20181015.

```
namValPairs {
  namValPair {
    "nam": "staMtd"
    "val": "max"
  }
  namValPair {
    "nam": "rngTim"
    "val": "20181001-20181015"
  }
}
```

For another example, when the NSCF device needs to temporarily perform charging (for example, charging is triggered because the customer temporarily requests account checking or bill run at an intermediate time of a charging period or before bill run time), a new indication parameter may be carried in a subscription update request, for example, immediatelyReporting, to indicate that data corresponding to the network slice performance indicator needs to be immediately reported (without waiting for an end of a period for providing statistics). Alternatively, the subscription update request does not carry any parameter, to indicate that the data corresponding to the network slice performance indicator needs to be immediately reported.

Step 602: The NSCF device sends the subscription update request for a subscription resource to the NSMF device, where the subscription update request includes subId and namValPairs.

Specifically, the NSCF device sends the subscription update request to the NSMF device. The subscription update request includes a subscription identifier subId (for example, subId1 or subId2) that is received from the NSMF device and that is allocated by the NSMF device and namValPairs determined in the previous step, and namValPairs is an optional parameter.

Step 603: The NSMF device obtains latest data befArg-Data corresponding to the network slice performance indicator.

Specifically, after receiving the subscription update request, the NSMF device first obtains latest data corresponding to the network slice performance indicator. If the NSCF device previously subscribes to a statistics value of the network slice performance indicator (as exemplified by the method corresponding to FIG. 4A and FIG. 4B), the NSMF device obtains a latest statistics value befArgSta of the network slice performance indicator (for example, pfmArg1) previously subscribed to by the NSCF device. A time range for providing the latest statistics value befArgSta is from a start time point in a previous time range for providing statistics (for example, timRng1) to a current time point. If the NSCF device previously subscribes to a sampling value of the network slice performance indicator (as exemplified by the method corresponding to FIG. 5A and FIG. 5B), the NSMF device obtains a sampling value befArgSmp that needs to be currently sampled and sent for the network slice performance indicator (for example, pfmArg2) subscribed to by the NSCF device. If the sampling value near the current time has been sent, or the NSCF device does not need the latest data corresponding to the network slice performance indicator, the NSMF device may not perform this step.

Step 604: The NSMF device performs a subscription update operation related to the subscription resource based on namValPairs.

Specifically, the NSMF device changes a parameter in a previous subscription based on each namValPair in namValPairs. For example, the NSMF device changes a "method for providing statistics" to "obtaining a maximum value", and changes a "time range for providing statistics" to "20181001-20181015". In this way, a previously created task obtains the data corresponding to the network slice performance indicator based on the newly changed parameter.

Step 605: The NSMF device sends a subscription update response message to the NSCF device, where the subscription update response message includes subId and befArgData.

Specifically, the NSMF device sends the subscription update response message to the NSCF device. The subscription update response message includes subId and befArg-Data, befArgData is optional, and a value of befArgData may be befArgSmp or befArgSta.

Step 606: The NSMF device sends a notification to the NSCF device, where the notification includes befArg-Data.

This step is optional. When the NSMF device does not send befArgData by using the subscription response message, an alternative measure is that the NSMF device may alternatively send the notification to the NSCF device, where the notification includes befArgData.

Step 607: The NSCF device performs charging on the network slice instance based on befArgData.

Specifically, after receiving the subscription response message or the notification message, the NSCF device performs charging on the network slice instance based on befArgData in the subscription response message or the notification message. If befArgData is befArgSta, refer to the execution process of step 413. If befArgData is befArgSmp, refer to the execution process of step 512.

Figure 7:
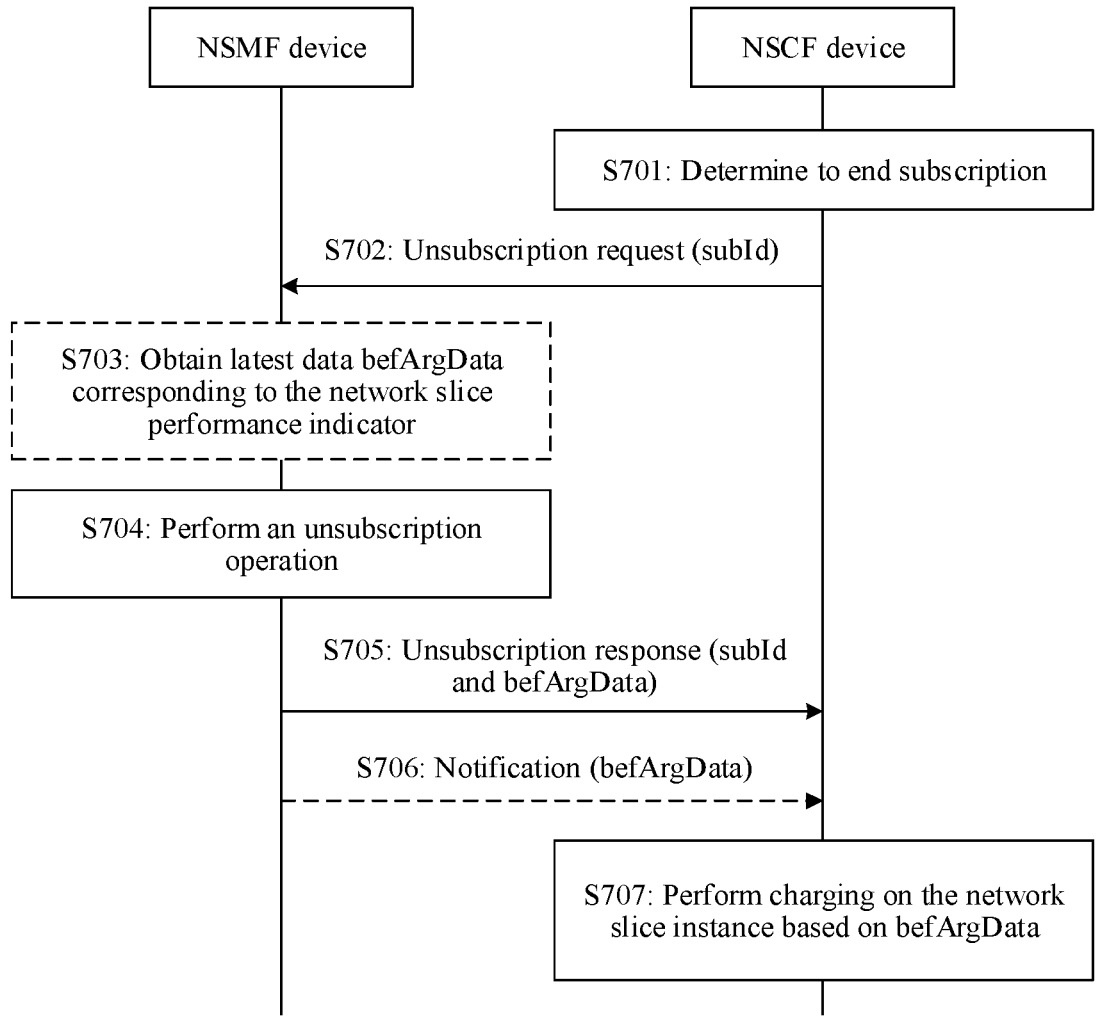
FIG. 7 is a flowchart of still another method for performing charging on a network resource according to an embodiment of this application.

Considering that the NSMF device may no longer need to provide the data corresponding to the network slice performance indicator in the network slice instance after a use time of a network slice instance is terminated or expires, the NSCF device can be enabled to indicate the NSMF device to perform unsubscription related to the subscription resource, so that the NSMF device timely recycles a computing resource previously invested. FIG. 7 is a flowchart of still another method for performing charging on a network slice instance according to an embodiment of this application. The method is also implemented based on the architecture shown in FIG. 3. In the method, an NSMF device corresponds to the NSMF device 302 in FIG. 3, and an NSCF device corresponds to the NSCF device 301 in FIG. 3. In the method, the NSCF device may request, based on subscription information of a customer or account balance information of the customer, the NSMF device to perform unsubscription related to the subscription resource. The method specifically includes the following steps.

Step 701: The NSCF device determines to end subscription.

Specifically, the NSCF device determines to notify, based on a factor such as the subscription information of the customer or the account balance of the customer, the NSMF device to end the subscription.

Step 702: The NSCF device sends an unsubscription request related to the subscription resource to the NSMF device, where the unsubscription request includes an identifier subId of the subscription resource.

Specifically, the NSCF device sends the unsubscription request related to the subscription resource to the NSMF device, and the unsubscription request includes the identifier subId (for example, subId1 or subId2) of the subscription resource that is previously received from the NSMF device and that is allocated by the NSMF device.

The subscription resource is the subscription resource in the steps 202, 409, and 509.

Step 703: The NSMF device obtains latest data befArgData corresponding to the network slice performance indicator.

This step is similar to step 603.

Step 704: The NSMF device performs an unsubscription operation.

Specifically, the NSMF device may stop and delete a task previously created for obtaining the data corresponding to the network slice performance indicator, to recycle a computing resource occupied by the task.

Step 705: The NSMF device sends an unsubscription response message to the NSCF device, where the unsubscription response message includes subId and befArgData.

This step is similar to step 605.

Step 706: The NSMF device sends a notification to the NSCF device, where the notification includes befArgData.

This step is similar to step 606.

Step 707: The NSCF device performs charging on a network slice instance based on befArgData.

This step is similar to step 607.

Figure 8:
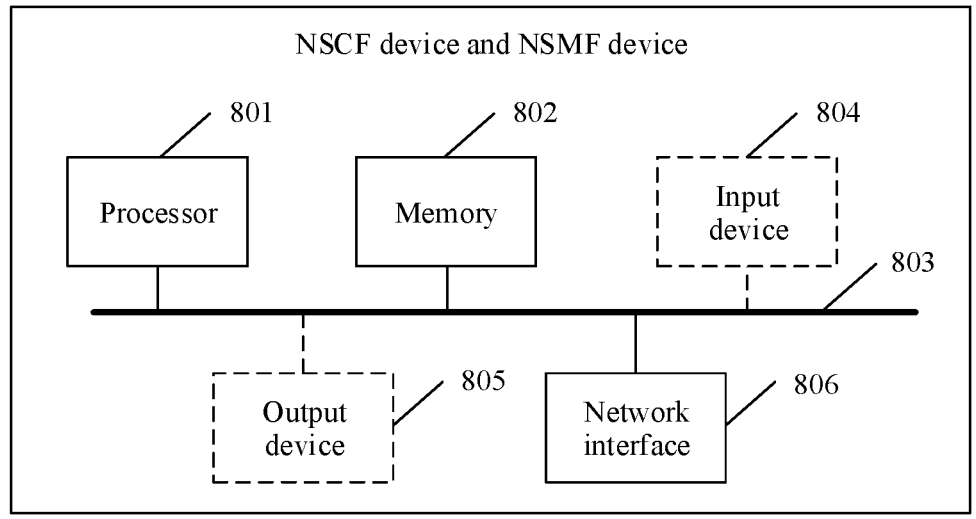
FIG. 8 is a structural diagram of hardware of an NSCF device or an NSMF device according to an embodiment of this application.

FIG. 8 is a structural diagram of hardware of an NSCF device or an NSMF device according to an embodiment of this application. All NSCF devices (for example, 101 in FIGS. 1 and 301 in FIG. 3) and all NSMF devices (for example, 102 in FIG. 1 or 302 in FIG. 3) in the embodiments of this application may use general-purpose computer hardware shown in FIG. 8. The general-purpose computer hardware includes a processor 801, a memory 802, a bus 803, an input device 804, an output device 805, and a network interface 806. The input device 804 and the output device 805 are optional.

Specifically, the memory 802 may include a computer storage medium in a form of a volatile and/or nonvolatile memory, for example, a read-only memory and/or a random access memory. The memory 802 can store an operating system, an application program, another program module, executable code, and program data.

The input device 804 may be configured to input information to facilitate a system administrator to operate and manage the device, for example, configure a default charging rule and a default time range for providing statistics. The input device 804 may be a keyboard or a pointing device, for example, a mouse, a trackball, a touchpad, a microphone, a joystick, a game pad, a satellite television antenna, a scanner, or similar devices. These input devices may be connected to the processor 801 through the bus 803.

The output device 805 may be configured to output information, so that the system administrator operates and manages the device. The output device 805 may be a monitor, or another peripheral output device, for example, a loudspeaker and/or a print device. These output devices may also be connected to the processor 801 through the bus 803.

The NSCF device or the NSMF device may be connected to a network through the network interface 806, for example, connected to a local area network (LAN). In a network connection environment, a computer-executable instruction stored in the device may be stored in a remote storage device, and is not limited to being locally stored.

For the NSCF device, when the processor 801 in the NSCF device executes the executable code or the application program stored in the memory 802, the NSCF device may perform the method steps corresponding to the NSCF device in all the foregoing embodiments, for example, step 201, step 205, step 406, and step 407. For a specific execution process, refer to the foregoing embodiments. Details are not described herein again.

For the NSMF device, when the processor 801 executes the executable code or the application program stored in the memory 802, the NSMF device may perform the method steps corresponding to the NSMF device in all the foregoing embodiments, for example, step 203, step 208, step 410, and step 411. For a specific execution process, refer to the foregoing embodiments. Details are not described herein again.

Figure 9:
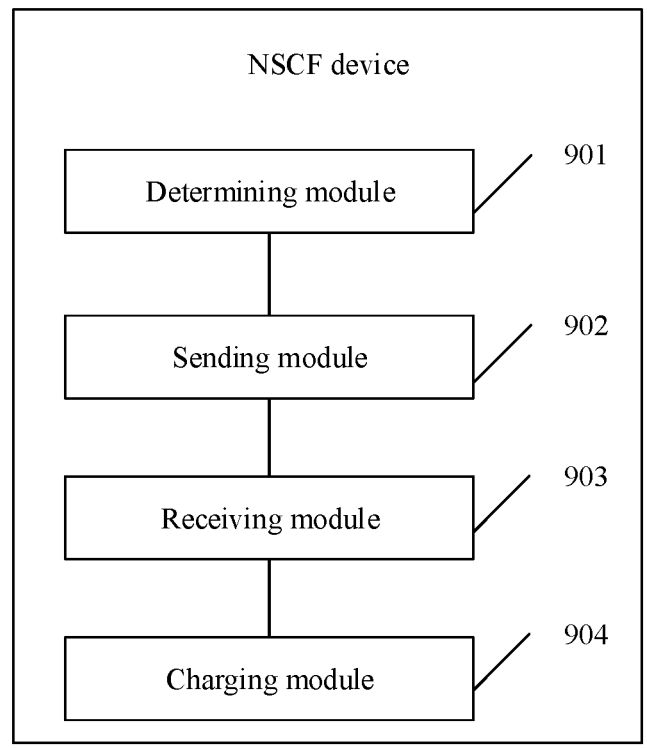
FIG. 9 is a schematic structural diagram of an NSCF device according to an embodiment of this application.

FIG. 9 is a schematic structural diagram of an NSCF device according to an embodiment of this application. The NSCF device includes a determining module 901, a sending module 902, a receiving module 903, and a charging module 904.

The determining module 901 is configured to determine a network slice performance indicator that is used for performing charging on a network slice instance, for example, determine the network slice performance indicator based on subscription information of a customer or information preconfigured by an operator. For a specific execution process, refer to the step descriptions on an NSCF device side in the foregoing embodiments, for example, step 201, step 406, and step 506.

The sending module 902 is configured to: include an identifier of the network slice instance and the network slice performance indicator in a first message, and send the first message to an NSMF device, for example, create a subscription request message, add the identifier of the network slice instance and the network slice performance indicator to the subscription request message, and send the subscription request message to an NSMF device. For a specific execution process, refer to the step descriptions on an NSMF device side in the foregoing embodiments, for example, step 202, step 408, and step 508.

The receiving module 903 is configured to receive a second message from the NSMF device, where the second message includes data corresponding to the network slice performance indicator, for example, receive a subscription notification message from the NSMF device, where the subscription notification message includes the data corresponding to the network slice performance indicator, and the data may be specifically a sampling value of the network slice performance indicator, or may be a statistics value of the network slice performance indicator. For a specific execution process, refer to the step descriptions on an NSCF device side in the foregoing embodiments, for example, step 204, step 205, step 412, and step 511.

The charging module 904 is configured to perform charging on the network slice instance based on the data corresponding to the network slice performance indicator. For example, if the data corresponding to the network slice performance indicator is the sampling value, the charging module 904 may store the sampling value in a charging data record of the sampling value of the indicator. If the data corresponding to the network slice performance indicator is the statistics value, the charging module 904 may calculate a fee for use of the network slice instance based on the statistics value, or store the statistics value in a charging data record of the statistics value of the indicator, to subsequently calculate the fee for use of the network slice instance. For a specific execution process, refer to the step descriptions on the NSCF device side in the foregoing embodiments, for example, step 205, step 413, and step 512.

In this embodiment, the NSCF device is presented in a form of a functional module. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the NSCF device may also be in a form shown in FIG. 8. The determining module 901, the sending module 902, the receiving module 903, and the charging module 904 may all be implemented by using the processor 801 and the memory 802 in FIG. 8. For example, a function of calculating the fee for use of the network slice instance by the charging module 904 may be implemented by the processor 801 by executing the code stored in the memory 802.

Figure 10:
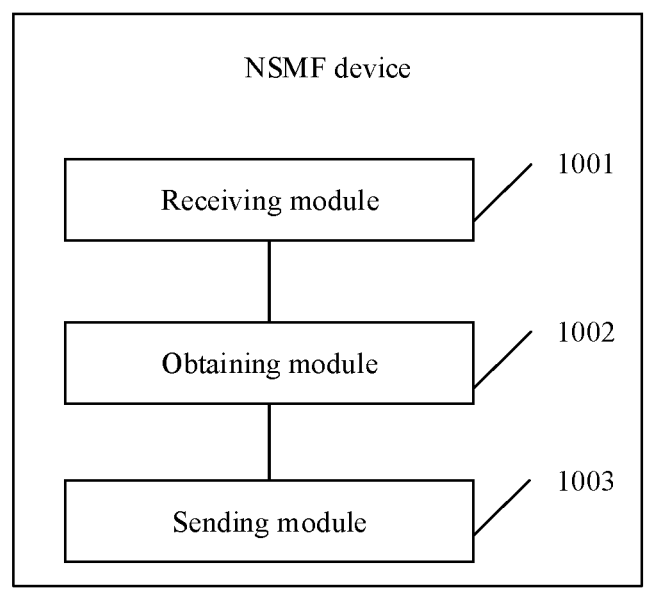
FIG. 10 is a schematic structural diagram of an NSMF device according to an embodiment of this application.

FIG. 10 is a schematic structural diagram of an NSMF device according to an embodiment of this application. The NSMF device includes a receiving module 1001, an obtaining module 1002, and a sending module 1003.

The receiving module 1001 is configured to receive a first message from an NSCF device, where the first message includes an identifier of a network slice instance and a network slice performance indicator. For a specific execution process, refer to the step descriptions on an NSMF device side in the foregoing embodiments, for example, step 202, step 408, and step 508.

The obtaining module 1002 is configured to obtain, based on the first message, data corresponding to the network slice performance indicator, where a sampling value of the network slice performance indicator may be obtained, or a statistics value of the network slice performance indicator may be obtained, and if the statistics value is obtained, the obtaining module 1002 may calculate the statistics value of the network slice performance indicator based on a time range for providing statistics and a method for providing statistics in the first message. For a specific execution process, refer to the step descriptions on the NSMF device side in the foregoing embodiments, for example, step 203, step 410, step 411, and step 510.

The sending module 1003 is configured to include the data corresponding to the network slice performance indicator in a second message, and send the second message to the NSCF device, so that the NSCF device performs charging on the network slice instance based on the data corresponding to the network slice performance indicator. For a specific execution process, refer to the step descriptions on the NSMF device side in the foregoing embodiments, for example, step 204, step 412, and step 511.

In this embodiment, the NSMF device is presented in a form of a functional module. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that the NSMF device may also be in a form shown in FIG. 8. The receiving module 1001, the obtaining module 1002, and the sending module 1003 may all be implemented by using the processor 801 and the memory 802 in FIG. 8. For example, a function of obtaining the data corresponding to the network slice performance indicator by the obtaining module 1002 may be implemented by the processor 801 by executing the code stored in the memory 802.

A person of ordinary skill in the art may be aware that, the units and algorithm steps in the examples described with reference to the embodiments disclosed in this specification may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person of ordinary skill in the art that, for ease and brief description, for a detailed working process of the foregoing system, apparatus, and unit, refer to a corresponding process in the foregoing method embodiments, and details are not described herein again.

In the several embodiments provided in this application, it may be understood that the disclosed system, apparatus, and method may be implemented in other manners. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments in this application.

In addition, function units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions in this application essentially, or the part contributing to the prior art, or all or some of the technical solutions may be implemented in the form of a software product. The computer software product is stored in a storage medium and includes a plurality of instructions for instructing a computer device (which may be a personal computer, a server, a network device, or the like) to perform all or some of the steps of the methods described in the embodiments of this application. The foregoing storage medium includes: any medium that can store program code, for example a USB flash drive, a read-only memory, a random access memory, a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for performing charging on a network resource, comprising:
    sending, by a network slice charging function device to a network slice management function device, a subscription request message that comprises an identifier of a network slice instance, wherein the subscription request message is used to request information for charging on the network slice instance corresponding to the identifier;
    receiving, by the network slice charging function device from the network slice management function device, a subscription notification message that comprises data corresponding to a network slice performance indicator of the network slice instance, wherein the network slice performance indicator describes a network performance of the network slice instance; and
    performing, by the network slice charging function device, charging on the network slice instance based on the data corresponding to the network slice performance indicator.

2. The method according to claim 1, wherein the subscription request message further comprises the network slice performance indicator.

3. The method according to claim 1, wherein:
    the data corresponding to the network slice performance indicator comprises a value of the network slice performance indicator, and
    the performing charging on the network slice instance based on the data corresponding to the network slice performance indicator comprises storing the value of the network slice performance indicator in a charging data record.

4. The method according to claim 1, wherein the method further comprises determining, by the network slice charging function device, a time range for providing statistics about the network slice performance indicator before sending the subscription request message to the network slice management function device, wherein the time range for providing statistics indicates the network slice management function device is to provide statistics on one or more values of the network slice performance indicator within the time range for providing statistics; and
    wherein the subscription request message further comprises the time range for providing statistics.

5. The method according to claim 1, wherein:
    the data corresponding to the network slice performance indicator comprises a statistics value of the network slice performance indicator, and
    the performing the charging on the network slice instance based on the data corresponding to the network slice performance indicator comprises performing the charging on the network slice instance based on the statistics value of the network slice performance indicator.

6. The method according to claim 1, wherein the subscription request message is used to request the network slice management function device to generate a subscription resource for the network slice instance.

7. The method according to claim 6, further comprising:
    sending, by the network slice charging function device to the network slice management function device, a subscription update request message that comprises at least one of the group consisting of: a target time range for providing statistics, a target interval time, a target method for providing statistics, and a target network slice performance indicator; and
    receiving, by the network slice charging function device from the network slice management function device, the data that corresponds to the network slice performance indicator and that exists before the subscription resource is updated.

8. The method according to claim 6, further comprising:
    sending, by the network slice charging function device, an unsubscription request related to the subscription resource to the network slice management function device; and
    receiving, by the network slice charging function device from the network slice management function device, the data that corresponds to the network slice performance indicator and that exists before an unsubscription operation related to the subscription resource.

9. A method for performing charging on a network resource, comprising:
    receiving, by a network slice management function device from a network slice charging function device, a subscription request message that comprises an identifier of a network slice instance, wherein the subscription request is used to request information for charging on the network slice instance corresponding to the identifier;
    obtaining, by the network slice management function device based on the subscription request message, data corresponding to a network slice performance indicator of the network slice instance, wherein the network slice performance indicator describes a network performance of the network slice instance; and
    sending, by the network slice management function device to the network slice charging function device, a subscription notification message that comprises the data corresponding to the network slice performance indicator.

10. The method according to claim 9, wherein:
the network slice charging function device performs charging on the network slice instance based on the network slice performance indicator, and
the subscription request message further comprises the network slice performance indicator.

11. The method according to claim 9, wherein the obtaining data corresponding to the network slice performance indicator comprises obtaining a value of the network slice performance indicator.

12. The method according to claim 9, wherein:
the subscription request message further comprises a time range for providing statistics;
the data corresponding to the network slice performance indicator comprises a statistics value of the network slice performance indicator; and
the obtaining the data corresponding to the network slice performance indicator comprises:
obtaining a plurality of values of the network slice performance indicator of the network slice instance within the time range for providing statistics, and
providing statistics on the plurality of values of the network slice performance indicator, to obtain the statistics value of the network slice performance indicator.

13. The method according to claim 9, further comprising: generating, by the network slice management function device after the receiving the subscription request message, a subscription resource for the network slice instance.

14. The method according to claim 13, further comprising:
receiving, by the network slice management function device from the network slice charging function device, a subscription update request message for updating the subscription resource, wherein the subscription update request message comprises one or more of the group consisting of: a target time range for providing statistics, a target interval time, a target method for providing statistics, and a target network slice performance indicator;
performing, by the network slice management function device, a subscription update operation on the subscription resource based on the subscription update request message; and
sending, by the network slice management function device to the network slice charging function device, the data that corresponds to the network slice performance indicator and that exists before the subscription resource is updated.

15. The method according to claim 13, further comprising:
receiving, by the network slice management function device, an unsubscription request message related to the subscription resource from the network slice charging function device;
performing, by the network slice management function device, an unsubscription operation on the subscription resource based on the unsubscription request message; and
sending, by the network slice management function device to the network slice charging function device, the data that corresponds to the network slice performance indicator and that exists before the unsubscription operation related to the subscription resource.

16. A network slice charging function device, comprising: at least one processor and a memory, wherein the memory is configured to store a program, and wherein the program, when executed by the at least one processor, causes the network slice charging function device to carry out a method comprising:
sending, to a network slice management function device, a subscription request message comprises an identifier of a network slice instance, wherein the subscription request message is used to request information for charging on the network slice instance corresponding to the identifier;
receiving, from the network slice management function device, a subscription notification message that comprises data corresponding to a network slice performance indicator of the network slice instance, wherein the network slice performance indicator describes a network performance of the network slice instance; and
performing charging on the network slice instance based on the data corresponding to the network slice performance indicator.

17. The network slice charging function device according to claim 16, wherein the subscription request message is used to request the network slice management function device to generate a subscription resource for the network slice instance, and wherein the method further comprises:
sending to the network slice management function device, a subscription update request message for updating the subscription resource, wherein the subscription update request message comprises any one or any combination of a target time range for providing statistics, a target interval time, a target method for providing statistics, and or a target network slice performance indicator; and
receiving from the network slice management function device, the data that corresponds to the network slice performance indicator and that exists before the subscription resource is updated.

18. A network slice management function device, comprising: at least one processor and a memory, wherein the memory is configured to store a program, and wherein the program, when executed by the at least one processor, causes the network slice management function device to carry out a method comprising:
receiving, from a network slice charging function device, a subscription request message that comprises an identifier of a network slice instance, wherein the subscription request is used to request information for charging on the network slice instance corresponding to the identifier;
obtaining, based on the subscription request message, data corresponding to a network slice performance indicator of the network slice instance, wherein the network slice performance indicator describes a network performance of the network slice instance; and
sending, to the network slice charging function device, a subscription notification message that comprises the data corresponding to the network slice performance indicator.

19. The network slice management function device according to claim 18, wherein the program further causes the network slice management function device to generate a subscription resource for the network slice instance after the subscription request message is received.

20. A system for performing charging on a network resource, comprising:
a network slice management function device; and a network slice charging function device, wherein the network slice charging function device comprises at least one first processor and a first memory, wherein the first memory is configured to store a first program, and wherein the first program, when executed by the at least one first processor, causes the network slice charging function device to carry out the operations of:

sending, to a network slice management function device, a subscription request message that comprises an identifier of a network slice instance, wherein the subscription request message is used to request information for charging on the network slice instance corresponding to the identifier;

receiving, from the network slice management function device, a subscription notification message that comprises data corresponding to a network slice performance indicator of the network slice instance, wherein the network slice performance indicator describes a network performance of the network slice instance; and performing charging on the network slice instance based on the data corresponding to the network slice performance indicator; and wherein the network slice management function device comprises at least one second processor and a second memory, wherein the second memory is configured to store a program, and wherein the second program, when executed by the at least one second processor, causes the network slice management function device to carry out operations of:

receiving the subscription request message from the network slice charging function device;

obtaining, based on the subscription request message, the data corresponding to a network slice performance indicator of the network slice instance; and sending the subscription notification message to the network slice charging function device.

* * * * *